US012328275B2

(12) United States Patent
Sakhnini et al.

(10) Patent No.: US 12,328,275 B2
(45) Date of Patent: Jun. 10, 2025

(54) LIGHT LAYER 1 MEASUREMENT REPORT

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 17/664,703

(22) Filed: May 24, 2022

(65) Prior Publication Data

US 2023/0388069 A1 Nov. 30, 2023

(51) Int. Cl.
*H04L 5/00* (2006.01)
*H04W 24/10* (2009.01)

(52) U.S. Cl.
CPC .......... *H04L 5/0048* (2013.01); *H04L 5/0044* (2013.01); *H04W 24/10* (2013.01)

(58) Field of Classification Search
CPC ... H04L 5/0048; H04L 5/0044; H04L 1/0026; H04W 24/10; H04W 72/542; H04B 7/0641; H04B 7/082; H04B 7/0617
See application file for complete search history.

(56) References Cited

U.S. PATENT DOCUMENTS

| 2019/0150013 A1* | 5/2019 | Zhang | H04B 7/082 |
| | | | 375/224 |
| 2019/0190582 A1* | 6/2019 | Guo | H04B 7/0617 |

(Continued)

FOREIGN PATENT DOCUMENTS

| CN | 111316573 A | * | 6/2020 | ........... H04B 7/0695 |
| WO | WO-2022060014 A1 | * | 3/2022 | ........... H04B 7/0617 |

OTHER PUBLICATIONS

Huawei,et al., "EncodingofTypeandTypeIICSIParameters",3GPPD raft,3GPPTSGRANWG1 Meeting#90bis, R1-1718244,3rd GenerationPartnershipProject(GPP),Oct. 13, 2017,Oct. 8, 2017(Oct. 8, 2017),XP051 (Year: 2017).*

(Continued)

*Primary Examiner* — Ayaz R Sheikh
*Assistant Examiner* — Louis Samara
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may perform a measurement of one or more reference signals associated with a layer 1 (L1) measurement report. The UE may transmit a light L1 measurement report associated with the measurement of the one or more reference signals based at least in part on the measurement of the one or more reference signals satisfying one or more light L1 measurement report conditions, wherein the light L1 measurement report is based at least in part on a previously transmitted normal L1 measurement report, and wherein the light L1 measurement report at least one of: omits at least some information that was transmitted in the previously transmitted normal L1 measurement report, or contains different information than the previously transmitted normal L1 measurement report. Numerous other aspects are described.

20 Claims, 11 Drawing Sheets

(56) References Cited

U.S. PATENT DOCUMENTS

| | | | |
|---|---|---|---|
| 2019/0387423 A1* | 12/2019 | Takahashi | H04L 5/0048 |
| 2020/0045682 A1* | 2/2020 | Wang | H04W 24/10 |
| 2020/0128423 A1* | 4/2020 | Zhang | H04W 72/542 |
| 2021/0112433 A1* | 4/2021 | Ryu | H04L 1/0026 |
| 2021/0351833 A1* | 11/2021 | Sakhnini | H04B 7/0641 |

OTHER PUBLICATIONS

VIVO:"DiscussiononBeamMeasurement, BeamReportingandBeamIndication", 3GPPTSGRANWG1Meeting #90bis,R1-1717472,3rdGenerationPartnershipProject,Oct. 13, 2017,Oct. 8, 2017,12 Pages,XP051340660,sections1,2.1 (Year: 2017).*

Huawei, et al., "Encoding of Type I and Type II CSI Parameters", 3GPP Draft, 3GPP TSG RAN WG1 Meeting #90bis, R1-1718244, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051341426, 8 Pages, Sections 1 and 3.2.

International Search Report and Written Opinion—PCT/US2023/ 020211—ISA/EPO—Jul. 24, 2023.

VIVO: "Discussion on Beam Measurement, Beam Reporting and Beam Indication", 3GPP TSG RAN WG1 Meeting #90bis, R1-1717472, 3rd Generation Partnership Project, Mobile Competence Centre, 650, Route Des Lucioles, F-06921 Sophia-Antipolis Cedex, FR, vol. RAN WG1, No. Prague, CZ, Oct. 9, 2017-Oct. 13, 2017, Oct. 8, 2017, 12 Pages, XP051340660, sections 1, 2.1.2, 2.2.1, 2.2.2, 2.3.1, 2.3.2. Section 2.2.2, Section 2.2.3, figure 6, Chapters 1 and 2.2.1.

* cited by examiner

LIGHT LAYER 1 MEASUREMENT REPORT

FIELD OF THE DISCLOSURE

Aspects of the present disclosure generally relate to wireless communication and to techniques and apparatuses for a light layer 1 measurement report.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network entities that support communication for a user equipment (UE) or multiple UEs. A UE may communicate with a network entity via downlink communications and uplink communications. "Downlink" (or "DL") refers to a communication link from the network entity to the UE, and "uplink" (or "UL") refers to a communication link from the UE to the network entity.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include performing a measurement of one or more reference signals associated with a layer 1 (L1) measurement report. The method may include transmitting a light L1 measurement report associated with the measurement of the one or more reference signals based at least in part on the measurement of the one or more reference signals satisfying one or more light L1 measurement report conditions, wherein the light L1 measurement report is based at least in part on a previously transmitted normal L1 measurement report, and wherein the light L1 measurement report at least one of: omits at least some information that was transmitted in the previously transmitted normal L1 measurement report, or contains different information than the previously transmitted normal L1 measurement report.

Some aspects described herein relate to a method of wireless communication performed by a network entity. The method may include receiving, from a UE, a normal L1 measurement report. The method may include receiving, from the UE, a light L1 measurement report based at least in part on a measurement of one or more reference signals satisfying one or more light L1 measurement report conditions, wherein the light L1 measurement report is based at least in part on the normal L1 measurement report, and wherein the light L1 measurement report at least one of: omits at least some information that was transmitted in the normal L1 measurement report, or contains different information than information that was transmitted in the normal L1 measurement report.

Some aspects described herein relate to an apparatus for wireless communication at a UE. The apparatus may include a memory and one or more processors coupled to the memory. The one or more processors may be configured to perform a measurement of one or more reference signals associated with an L1 measurement report. The one or more processors may be configured to transmit a light L1 measurement report associated with the measurement of the one or more reference signals based at least in part on the measurement of the one or more reference signals satisfying one or more light L1 measurement report conditions, wherein the light L1 measurement report is based at least in part on a previously transmitted normal L1 measurement report, and wherein the light L1 measurement report at least one of: omits at least some information that was transmitted in the previously transmitted normal L1 measurement report, or contains different information than the previously transmitted normal L1 measurement report.

Some aspects described herein relate to an apparatus for wireless communication at a network entity. The apparatus may include a memory and one or more processors coupled to the memory. The one or more processors may be configured to receive, from a UE, a normal L1 measurement report. The one or more processors may be configured to receive, from the UE, a light L1 measurement report based at least in part on a measurement of one or more reference signals satisfying one or more light L1 measurement report conditions, wherein the light L1 measurement report is based at least in part on the normal L1 measurement report, and wherein the light L1 measurement report at least one of: omits at least some information that was transmitted in the previously transmitted normal L1 measurement report, or contains different information than the previously transmitted normal L1 measurement report.

Some aspects described herein relate to a non-transitory computer-readable medium that stores a set of instructions for wireless communication by a UE. The set of instructions, when executed by one or more processors of the UE, may cause the UE to perform a measurement of one or more reference signals associated with an L1 measurement report. The set of instructions, when executed by one or more processors of the UE, may cause the UE to transmit a light L1 measurement report associated with the measurement of the one or more reference signals based at least in part on the measurement of the one or more reference signals satisfying one or more light L1 measurement report conditions, wherein the light L1 measurement report is based at least in part on a previously transmitted normal L1 measurement report, and wherein the light L1 measurement report at least one of: omits at least some information that was transmitted in the previously transmitted normal L1 measurement report, or contains different information than the previously transmitted normal L1 measurement report.

Some aspects described herein relate to a non-transitory computer-readable medium that stores a set of instructions for wireless communication by a network entity. The set of instructions, when executed by one or more processors of the network entity, may cause the network entity to receive, from a UE, a normal L1 measurement report. The set of instructions, when executed by one or more processors of the network entity, may cause the network entity to receive, from the UE, a light L1 measurement report based at least in part on a measurement of one or more reference signals satisfying one or more light L1 measurement report conditions, wherein the light L1 measurement report is based at least in part on the normal L1 measurement report, and wherein the light L1 measurement report at least one of: omits at least some information that was transmitted in the previously transmitted normal L1 measurement report, or contains different information than the previously transmitted normal L1 measurement report.

Some aspects described herein relate to an apparatus for wireless communication. The apparatus may include means for performing a measurement of one or more reference signals associated with an L1 measurement report. The apparatus may include means for transmitting a light L1 measurement report associated with the measurement of the one or more reference signals based at least in part on the measurement of the one or more reference signals satisfying one or more light L1 measurement report conditions, wherein the light L1 measurement report is based at least in part on a previously transmitted normal L1 measurement report, and wherein the light L1 measurement report at least one of: omits at least some information that was transmitted in the previously transmitted normal L1 measurement report, or contains different information than the previously transmitted normal L1 measurement report.

Some aspects described herein relate to an apparatus for wireless communication. The apparatus may include means for receiving, from a UE, a normal L1 measurement report. The apparatus may include means for receiving, from the UE, a light L1 measurement report based at least in part on a measurement of one or more reference signals satisfying one or more light L1 measurement report conditions, wherein the light L1 measurement report is based at least in part on the normal L1 measurement report, and wherein the light L1 measurement report at least one of: omits at least some information that was transmitted in the previously transmitted normal L1 measurement report, or contains different information than the previously transmitted normal L1 measurement report.

Aspects generally include a method, apparatus, system, computer program product, non-transitory computer-readable medium, user equipment, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
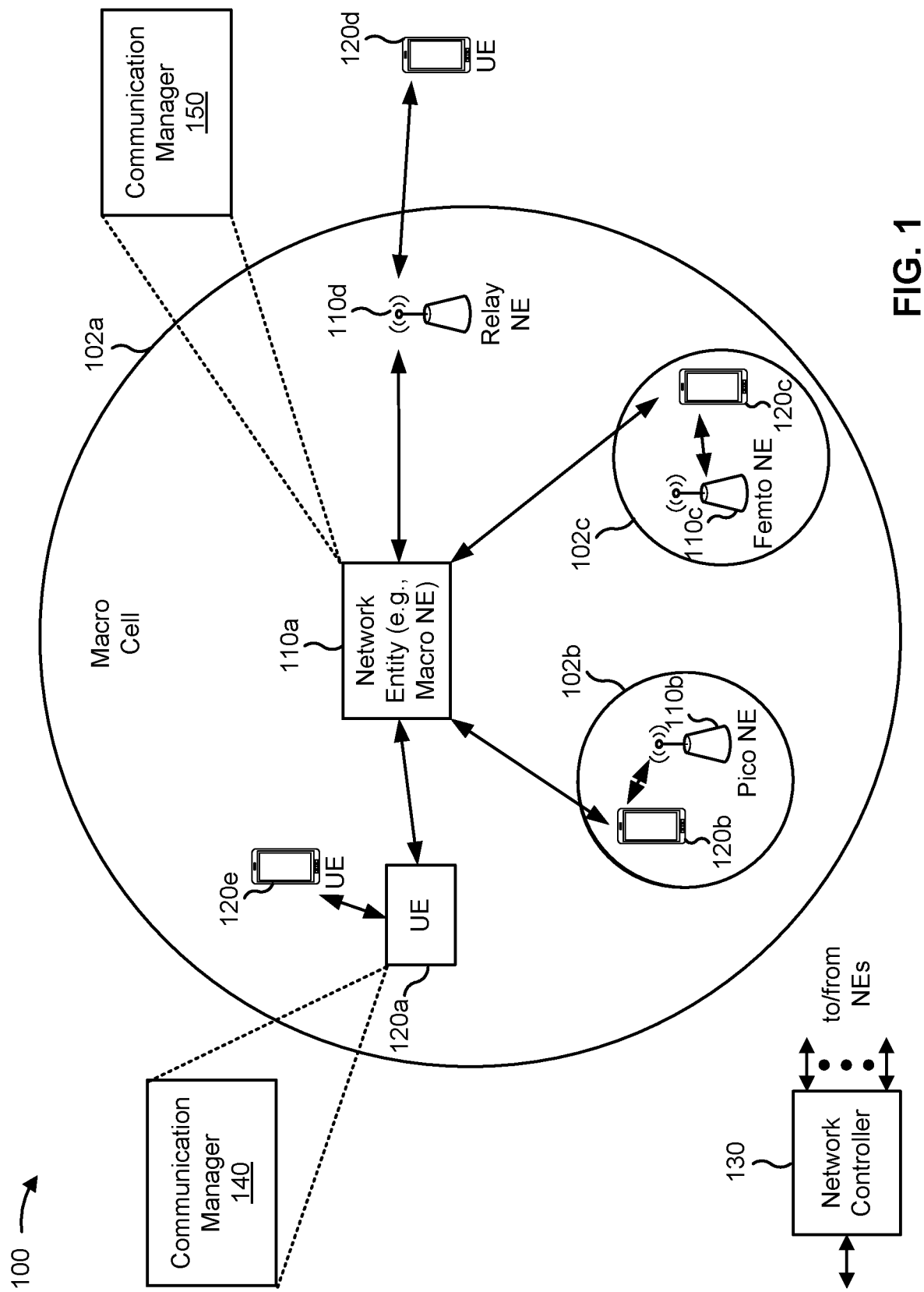
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network entities 110 (shown as a NE 110*a*, a NE 110*b*, a NE 110*c*, and a NE 110*d*), a user equipment (UE) 120 or multiple UEs 120 (shown as a UE 120*a*, a UE 120*b*, a UE 120*c*, a UE 120*d*, and a UE 120*e*), and/or other network entities. A network entity 110 is an entity that communicates with UEs 120. A network entity 110 (sometimes referred to as a NE) may include, for example, an NR base station, an LTE base station, a Node B, an eNB (e.g., in 4G), a gNB (e.g., in 5G), an access point, a transmission reception point (TRP), and/or a disaggregated portion of a base station such as a centralized unit (CU), a distributed unit (DU), and/or a radio unit (RU), which are described in more detail in connection with the open radio access network (O-RAN) architecture described shown in FIG. 3. Each network entity 110 may provide communication coverage for a particular geographic area. In the Third Generation Partnership Project (3GPP), the term "cell" can refer to a coverage area of a network entity 110 and/or a network entity subsystem serving this coverage area, depending on the context in which the term is used.

A network entity 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A network entity 110 for a macro cell may be referred to as a macro network entity. A network entity 110 for a pico cell may be referred to as a pico network entity. A network entity 110 for a femto cell may be referred to as a femto network entity or an in-home network entity. In the example shown in FIG. 1, the NE 110*a* may be a macro network entity for a macro cell 102*a*, the NE 110*b* may be a pico network entity for a pico cell 102*b*, and the NE 110*c* may be a femto network entity for a femto cell 102*c*. A network entity may support one or multiple (e.g., three) cells.

In some examples, a cell may not necessarily be stationary, and the geographic area of the cell may move according to the location of a network entity 110 that is mobile (e.g., a mobile network entity). In some examples, the network entities 110 may be interconnected to one another and/or to one or more other network entities 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network entity 110 or a UE 120) and send a transmission of the data to a downstream station (e.g., a UE 120 or a network entity 110). A relay station may be a UE 120 that can relay transmissions for other UEs 120. In the example shown in FIG. 1, the NE 110*d* (e.g., a relay network entity) may communicate with the NE 110*a* (e.g., a macro network entity) and the UE 120*d* in order to facilitate communication between the NE 110*a* and the UE 120*d*. A network entity 110 that relays communications may be referred to as a relay station, a relay network entity, a relay, or the like.

The wireless network 100 may be a heterogeneous network that includes network entities 110 of different types, such as macro network entities, pico network entities, femto network entities, relay network entities, or the like. These different types of network entities 110 may have different transmit power levels, different coverage areas, and/or different impacts on interference in the wireless network 100. For example, macro network entities may have a high transmit power level (e.g., 5 to 40 watts) whereas pico network entities, femto network entities, and relay network entities may have lower transmit power levels (e.g., 0.1 to 2 watts).

A network controller 130 may couple to or communicate with a set of network entities 110 and may provide coordination and control for these network entities 110. The network controller 130 may communicate with the network entities 110 via a backhaul communication link. The network entities 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network entity 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform a measurement of one or more reference signals associated with a layer 1 (L1) measurement report; and transmit a light L1 measurement report associated with the measurement of the one or more reference signals based at least in part on the measurement of the one or more reference signals satisfying one or more light L1 measurement report conditions, wherein the light L1 measurement report is based at least in part on a previously transmitted normal L1 measurement report, and wherein the light L1 measurement report at least one of: omits at least some information that was transmitted in the previously transmitted normal L1 measurement report, or contains different information than the previously transmitted normal L1 measurement report. Additionally, or alternatively, the communication manager 140 may perform one or more other operations described herein.

In some aspects, the network entity 110 may include a communication manager 150. As described in more detail elsewhere herein, the communication manager 150 may receive, from a UE, a normal L1 measurement report; and receive, from the UE, a light L1 measurement report based at least in part on a measurement of one or more reference signals satisfying one or more light L1 measurement report conditions, wherein the light L1 measurement report is based at least in part on the normal L1 measurement report, and wherein the light L1 measurement report at least one of: omits at least some information that was transmitted in the normal L1 measurement report, or contains different information than information that was transmitted in the normal L1 measurement report. Additionally, or alternatively, the communication manager 150 may perform one or more other operations described herein.

As indicated above, FIG. 1 is provided as an example. Other examples may differ from what is described with regard to FIG. 1.

Figure 2:
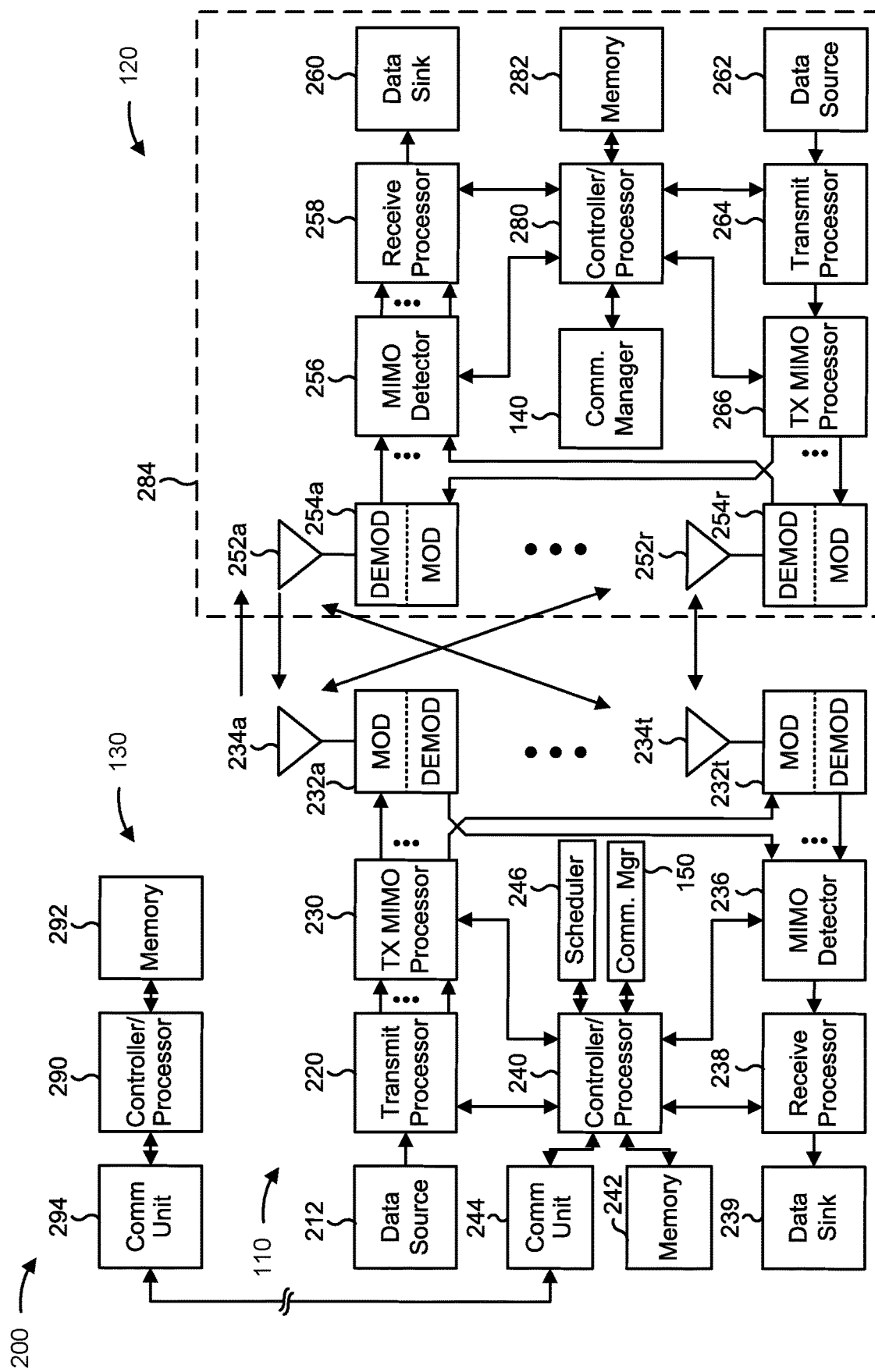
FIG. 2 is a diagram illustrating an example of a network entity in communication with a user equipment (UE) in a wireless network, in accordance with the present disclosure.

FIG. 2 is a diagram illustrating an example 200 of a network entity 110 in communication with a UE 120 in a wireless network 100, in accordance with the present disclosure. The network entity 110 may be equipped with a set of antennas 234a through 234t, such as T antennas (T≥1). The UE 120 may be equipped with a set of antennas 252a through 252r, such as R antennas (R≥1).

At the network entity 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network entity 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network entity 110 and/or other network entities 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network entity 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity 110 may include a communication unit 244 and may communicate with the network controller 130 via the communication unit 244. The network entity 110 may include a scheduler 246 to schedule one or more UEs 120 for downlink and/or uplink communications. In some examples, the modem 232 of the network entity 110 may include a modulator and a demodulator. In some examples, the network entity 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network entity 110, the controller/processor 280 of the UE 120, and/or any other component(s) of FIG. 2 may perform one or more techniques associated with a light L1 measurement report, as described in more detail elsewhere herein. For example, the controller/processor 240 of the network entity 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network entity 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity 110 and/or the UE 120, may cause the one or more processors, the UE 120, and/or the network entity 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for performing a measurement of one or more reference signals associated with an L1 measurement report (e.g., using controller/processor 280, memory 282, or the like); and/or means for transmitting a light L1 measurement report associated with the measurement of the one or more reference signals based at least in part on the measurement of the one or more reference signals satisfying one or more light L1 measurement report conditions, wherein the light L1 measurement report is based at least in part on a previously transmitted normal L1 measurement report, and wherein the light L1 measurement report at least one of: omits at least some information that was transmitted in the previously transmitted normal L1 measurement report, or contains different information than the previously transmitted normal L1 measurement report (e.g., using controller/processor 280, transmit processor 264, TX MIMO processor 266, modem 254, antenna 252, memory 282, or the like). The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity 110 includes means for receiving, from a UE (e.g., UE 120), a normal L1 measurement report (e.g., using antenna 234, modem 232, MIMO detector 236, receive processor 238, controller/processor 240, memory 242, or the like); and/or means for receiving, from the UE, a light L1 measurement report based at least in part on a measurement of one or more reference signals satisfying one or more light L1 measurement report conditions, wherein the light L1 measurement report is based at least in part on the normal L1 measurement report, and wherein the light L1 measurement report at least one of: omits at least some information that was transmitted in the normal L1 measurement report, or contains different information than information that was transmitted in the normal L1 measurement report (e.g., using antenna 234, modem 232, MIMO detector 236, receive processor 238, controller/processor 240, memory 242, or the like). In some aspects, the means for the network entity 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
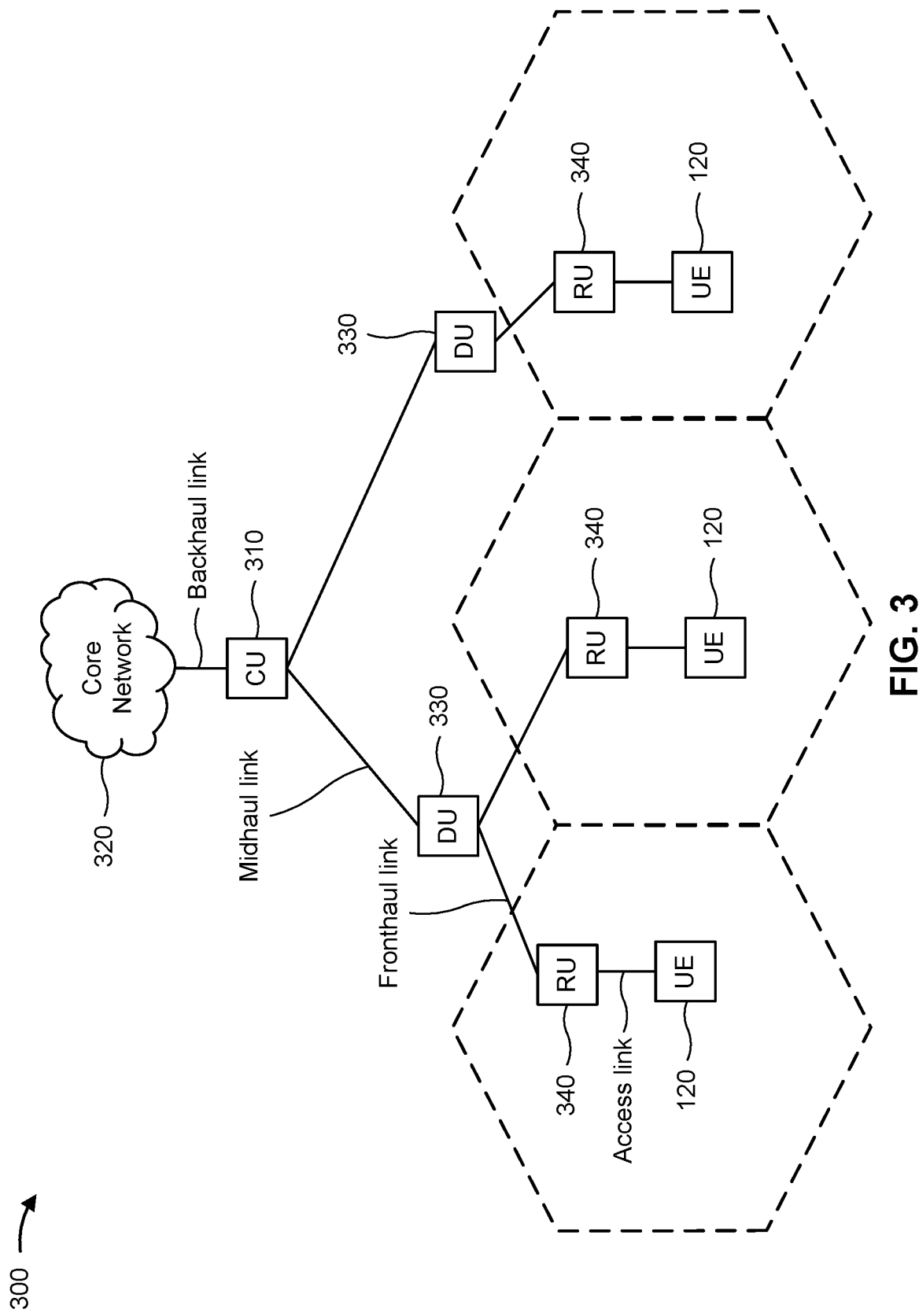
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a CU 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a network entity 110 (e.g., a base station, an eNB, and/or a gNB) is provided by a DU 330 and one or more RUs 340 that communicate over a fronthaul link. Accordingly, as described herein, a network entity 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
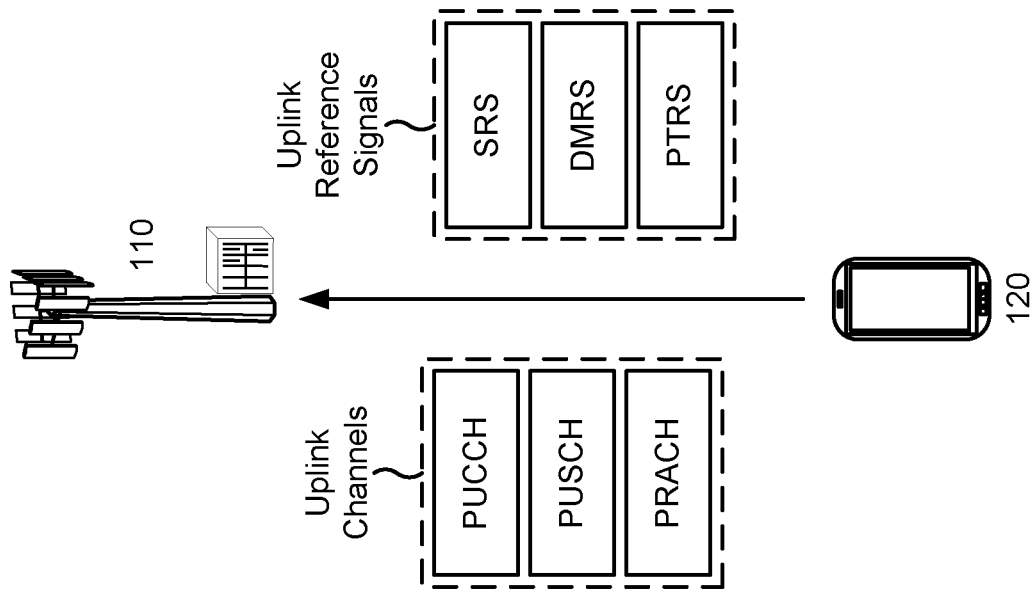
FIG. 4 is a diagram illustrating an example of physical channels and reference signals in a wireless network, in accordance with the present disclosure.
Figure 4:
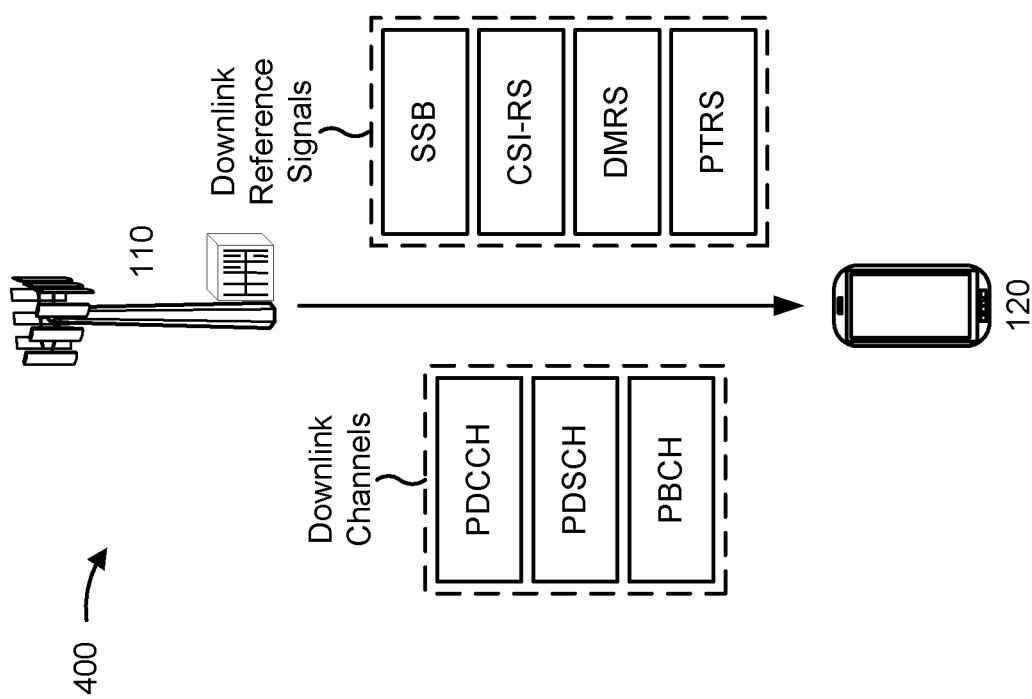

FIG. 4 is a diagram illustrating an example 400 of physical channels and reference signals in a wireless network, in accordance with the present disclosure. As shown in FIG. 4, downlink channels and downlink reference signals may carry information from a network entity 110 to a UE 120, and uplink channels and uplink reference signals may carry information from a UE 120 to a network entity 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network entity 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network entity 110 may configure a set of CSI-RSs for the UE 120, and the UE 120 may measure the configured set of CSI-RSs. For example, a network entity 110 may configure a set of CSI-RS resources using a CSI reporting setting (e.g., a CSI report configuration), and the UE 120 may perform a channel measurement, an interference measurement, or the like based on the configured set of CSI-RS resources. In some aspects, the CSI-RS resources may include one or more of a non-zero power (NZP) CSI-RS resource for channel measurement (sometimes referred to as an NZP CMR resource), a CSI-RS resource for interference measurement (sometimes referred to as a CSI-IM resource), or an NZP CSI-RS resource for interference measurement (sometimes referred to as an NZP IMR resource). The CSI reporting setting may also configure a type of CSI report to be used, sometimes referred to as a measurement report or an L1 measurement report, such as one of a periodic CSI report, a semi-persistent CSI report, or an aperiodic CSI report, which is described in more detail in connection with FIG. 5.

Based at least in part on the measurements, the UE 120 may perform channel estimation and may report channel estimation parameters to the network entity 110 (e.g., in a CSI report and/or an L1 measurement report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network entity 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples. Additional aspects of CSI-RSs and related beam management procedures are described in more detail in connection with FIG. 5.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network entity 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network entities in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network entity 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
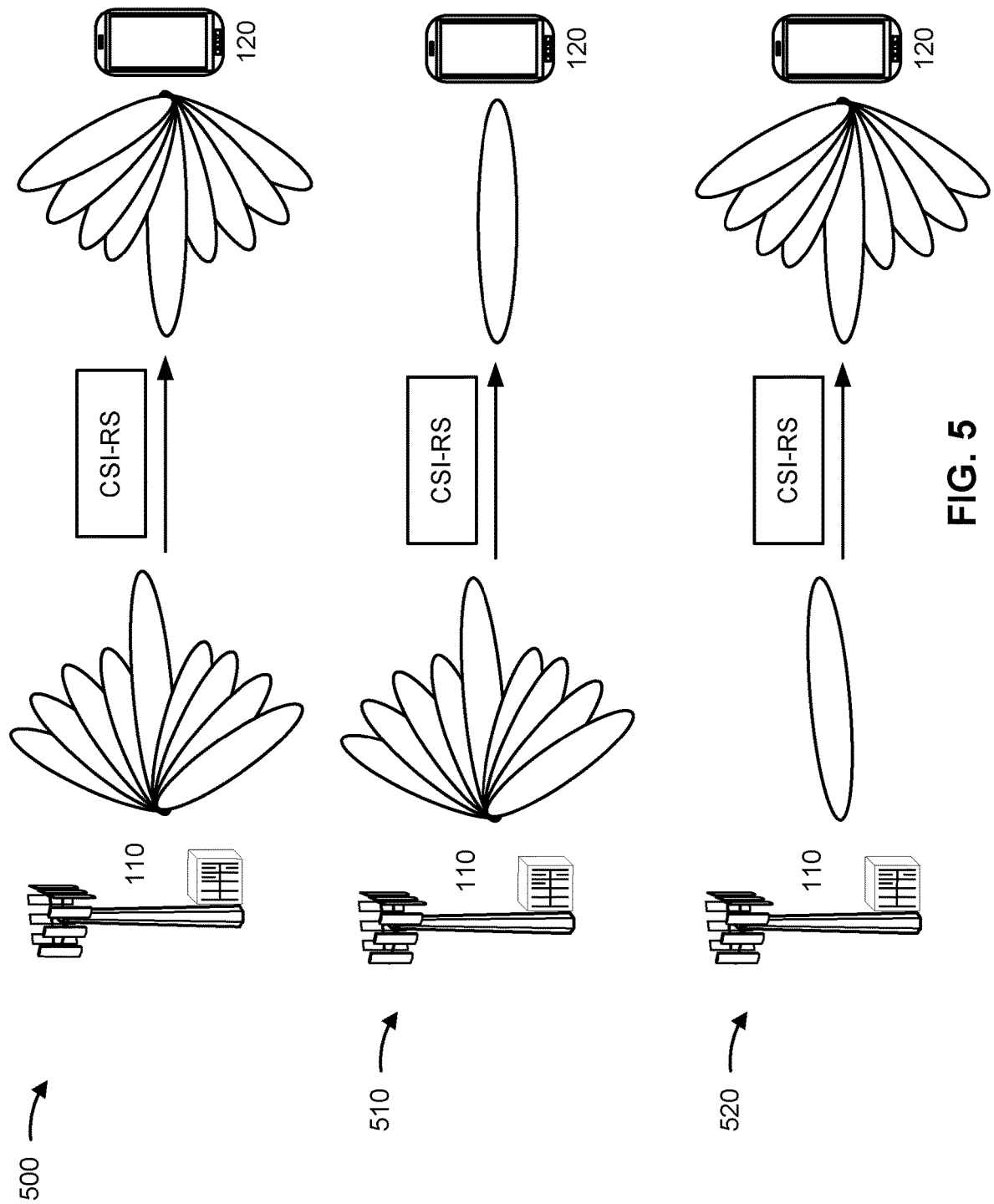
FIG. 5 is a diagram illustrating examples of channel state information reference signal beam management procedures, in accordance with the present disclosure.

FIG. 5 is a diagram illustrating examples 500, 510, and 520 of CSI-RS beam management procedures, in accordance with the present disclosure. As shown in FIG. 5, examples 500, 510, and 520 include a UE 120 in communication with a network entity 110 in a wireless network (e.g., wireless network 100). However, the devices shown in FIG. 5 are provided as examples, and the wireless network may support communication and beam management between other devices (e.g., between a UE 120 and a network entity 110 or TRP, between a mobile termination node and a control node, between an integrated access and backhaul (IAB) child node and an IAB parent node, and/or between a scheduled node and a scheduling node). In some aspects, the UE 120 and the network entity 110 may be in a connected state (e.g., an RRC connected state).

As shown in FIG. 5, example 500 may include a network entity 110 and a UE 120 communicating to perform beam management using CSI-RSs. Example 500 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 5 and example 500, CSI-RSs may be configured to be transmitted from the network entity 110 to the UE 120. The CSI-RSs may be configured to be periodic (e.g., using RRC signaling), semi-persistent (e.g., using media access control (MAC) control element (MAC-CE) signaling), and/or aperiodic (e.g., using DCI).

The first beam management procedure may include the network entity 110 performing beam sweeping over multiple transmit (Tx) beams. The network entity 110 may transmit a CSI-RS using each transmit beam for beam management. To enable the UE 120 to perform receive (Rx) beam sweeping, the network entity 110 may use a transmit beam to transmit (e.g., with repetitions) each CSI-RS at multiple times within the same RS resource set so that the UE 120 can sweep through receive beams in multiple transmission instances. For example, if the network entity 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network entity 110, the UE 120 may perform beam sweeping through the receive beams of the UE 120. As a result, the first beam management procedure may enable the UE 120 to measure a CSI-RS on different transmit beams using different receive beams to support selection of network entity 110 transmit beams/UE 120 receive beam(s) beam pair(s). The UE 120 may report the measurements to the network entity 110 to enable the network entity 110 to select one or more beam pair(s) for communication between the network entity 110 and the UE 120. While example 500 has been described in connection with CSI-RSs, the first beam management process may also use SSBs for beam management in a similar manner as described above.

As shown in FIG. 5, example 510 may include a network entity 110 and a UE 120 communicating to perform beam management using CSI-RSs. Example 510 depicts a second beam management procedure (e.g., P2 CSI-RS beam management). The second beam management procedure may be referred to as a beam refinement procedure, a network entity beam refinement procedure, a TRP beam refinement procedure, and/or a transmit beam refinement procedure. As shown in FIG. 5 and example 510, CSI-RSs may be configured to be transmitted from the network entity 110 to the UE 120. The CSI-RSs may be configured to be aperiodic (e.g., using DCI). The second beam management procedure may include the network entity 110 performing beam sweeping over one or more transmit beams. The one or more transmit beams may be a subset of all transmit beams associated with the network entity 110 (e.g., determined based at least in part on measurements reported by the UE 120 in connection with the first beam management procedure). The network entity 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network entity 110 to select a best transmit beam based at least in part on measurements of the CSI-RSs (e.g., measured by the UE 120 using the single receive beam) reported by the UE 120.

As shown in FIG. 5, example 520 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 5 and example 520, one or more CSI-RSs may be configured to be transmitted from the network entity 110 to the UE 120. The CSI-RSs may be configured to be aperiodic (e.g., using DCI). The third beam management process may include the network entity 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network entity 110 may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network entity 110 and/or the UE 120 to select a best receive beam based at least in part on reported measurements received from the UE 120 (e.g., of the CSI-RS of the transmit beam using the one or more receive beams). In some other aspects, the UE 120 and the network entity 110 may perform the third beam management procedure before performing the second beam management procedure, and/or the UE 120 and the network entity 110 may perform a similar beam management procedure to select a UE transmit beam.

In some aspects, such as in connection with one of the beam management procedures described above, the UE 120 may transmit, to the network entity 110, one or more CSI reports, such as one or more L1 measurement reports. An L1 measurement report may be used to report to the network entity 110 one or more CSI indexes and associated measurements for the best one or more beams measured by the UE 120. For example, measurements reported in an L1 measurement report may be performed for an NZP CSI-RS resource, an SSB resource, a CSI-IM resource, or the like. Moreover, in some aspects, the measurements may be an RSRP measurement (sometimes referred to as an L1-RSRP measurement), a signal-to-interference-plus-noise ratio (SINR) measurement (sometimes referred to as an L1-SINR measurement), or a similar measurement.

In some aspects, a UE 120 may be configured with one or more CSI resource settings (sometimes referred to as CSI-ResourceConfig) indicating one or more resource sets to be used to perform the measurements associated with an L1 measurement report (e.g., NZP CSI-RS resource sets, SSB resource sets, and/or CSI-IM resource sets). Moreover, the UE 120 may be configured with one or more CSI reporting settings (sometimes referred to as CSI-ReportConfig) indicating CSI-related, L1-RSRP-related, and/or L1-SINR-related quantities to report, which may be indicated using a report quantity parameter (sometimes referred to as report Quantity). In some aspects, a CSI report setting may be linked to a CSI resource setting. For example, measurements associated with a periodic CSI-RS may be reported in one of a periodic L1 measurement report (e.g., via a PUSCH), a semi-persistent L1 measurement report (e.g., via a PUCCH that is activated and/or deactivated using a MAC-CE, or a PUSCH that is triggered using DCI), or an aperiodic L1 measurement report (e.g., via a PUCCH). Measurements associated with a semi-persistent CSI-RS may be reported in one of a semi-persistent L1 measurement report or an aperiodic L1 measurement report. And measurements associated with an aperiodic CSI-RS may be reported in an aperiodic L1 measurement report.

Moreover, in some aspects, aperiodic CSI-RSs and/or semi-persistent CSI-RSs may be associated with one or more trigger states that activate the respective CSI-RSs (and thus the respective L1 measurement reports). For example, each trigger state associated with aperiodic triggering may contain a list of associated CSI reporting settings (e.g., CSI-ReportConfig) indicating the CSI resource set identifiers to be used for channel measurements and/or interference measurements. And each trigger state associated with semi-persistent triggering may contain one associated CSI reporting setting. In some aspects, triggering of aperiodic or semi-persistent CSI-RSs may be configured by an RRC message, and may thereafter be signaled using DCI for an aperiodic or a semi-persistent measurement report that is to be transmitted in a PUSCH, and using MAC-CE for a semi-persistent measurement report that is to be transmitted in a PUCCH. In some aspects, L1-RSRP measurements may be configured with a resource setting (e.g., CSI-ResourceConfig) with up to 16 CSI-RS resource sets, with up to 64 CSI-RS resources in each resource set (e.g., L1-RSRP measurements may be configured with up to 128 CSI resources), and L1-SINR measurements may be configured with a resource setting with up to 64 CSI-RS resources or up to 64 SSBs. Moreover, when performing L1-SINR measurements, a UE 120 may be configured with a combination of CMR resources and IMR resources, such as one of a combination of NZP CSI-RS for CMR and the same NZP CSI-RS for IMR, a combination of SSB for CMR and zero power (ZP) CSI-RS for IMR, a combination of SSB for CMR and the NZP CSI-RS for IMR, a combination of NZP CSI-RS for CMR and the ZP CSI-RS for IMR, or a combination of NZP CSI-RS for CMR and another NZP CSI-RS for IMR.

In some aspects, a UE 120 may be capable of transmitting a group-based beam report (e.g., a group-based L1 measurement report). A group-based beam report may permit a UE 120 to report measurements associated with multiple beams that the UE 120 is capable of receiving simultaneously, such as if the UE 120 is capable of receiving multiple beams on multiple panels, if the UE 120 is capable of receiving multiple reflected transmission beams using the same panel, or the like. In some aspects, group-based beam reporting may enable a network entity 110 to transmit communications to the UE 120 via two beams, and/or may enable a network entity 110 to switch transmit beams within a beam group with minimal delay.

If group-based beam reporting is disabled, a UE 120 may report multiple different CRIs or SS/PBCH block resource indications (SSBRIs) for each report setting, and, if group-based beam reporting is enabled, a UE 120 may report two different CRIs or SSBRIs for each report setting. In either event, the L1 measurement report may include an indication of a value of a largest measurement (e.g., a measurement of the strongest beam), quantized to seven bits, together with an associated CRI or SSBRI (which, in some aspects, may be six bits). Moreover, the L1 measurement report may include, for each remaining measurement to be reported, an indication of a differential between the measurement and the largest measurement, quantized to four bits, together with an associated CRI or SSBRI (which, again, may be six bits). A time between reception of a downlink reference signal (e.g., a CSI-RS or an SSB) and an uplink transmission of the L1 measurement report may be configured by the network entity 110 via a beam report timing parameter (sometimes referred to as beamReportTiming).

In some cases, consecutively transmitted L1 measurement reports may be very similar and/or may indicate little to no change in measured values and/or associated CRI, SSBRI, or the like. Put another way, a UE 120 may transmit multiple consecutive L1 measurement reports that indicate a measurement change of 0 dB from report to report. As described, certain L1 measurement reports may be associated with numerous reference signals and/or multiple configured settings, resulting in a large payload and thus large overhead, even when the L1 measurement report conveys little or no new information to the network entity 110. Nonetheless, even when measurements remain relatively static, a network entity 110 may still require a certain amount of L1 measurement reports to be transmitted in order to perform filtering and/or averaging of measurements across multiple L1 measurement reports, leading to high overhead and thus high latency, low throughput, and inefficient usage of network resources.

Some techniques and apparatuses described herein enable reduced overhead associated with beam reports, such as the L1 measurement reports described above. In some aspects, a UE 120 may transmit a light L1 measurement report (rather than a normal L1 measurement report), which may omit certain information contained in a normal L1 measurement report and/or which may contain different information than what is contained in a normal L1 measurement report, and thus may be associated with a reduced payload (and thus reduced overhead) as compared to a normal measurement report. In some aspects, the UE 120 may transmit a light L1 measurement report when certain conditions are met, such as when measurements associated with the light L1 measurement report are within a certain tolerance as compared to measurements associated with a previously transmitted report (e.g., when measurements remain relatively static), or the like. As a result, a network entity 110 may be provided with consistent L1 measurement reports for purposes of measurement filtering, averaging, or the like, while overhead associated with such reports is reduced. Reducing overhead associated with L1 measurement reports may result in decreased latency, increased throughput, and otherwise more efficient usage of network resources.

As indicated above, FIG. 5 is provided as an example. Other examples may differ from what is described with respect to FIG. 5.

Figure 6:
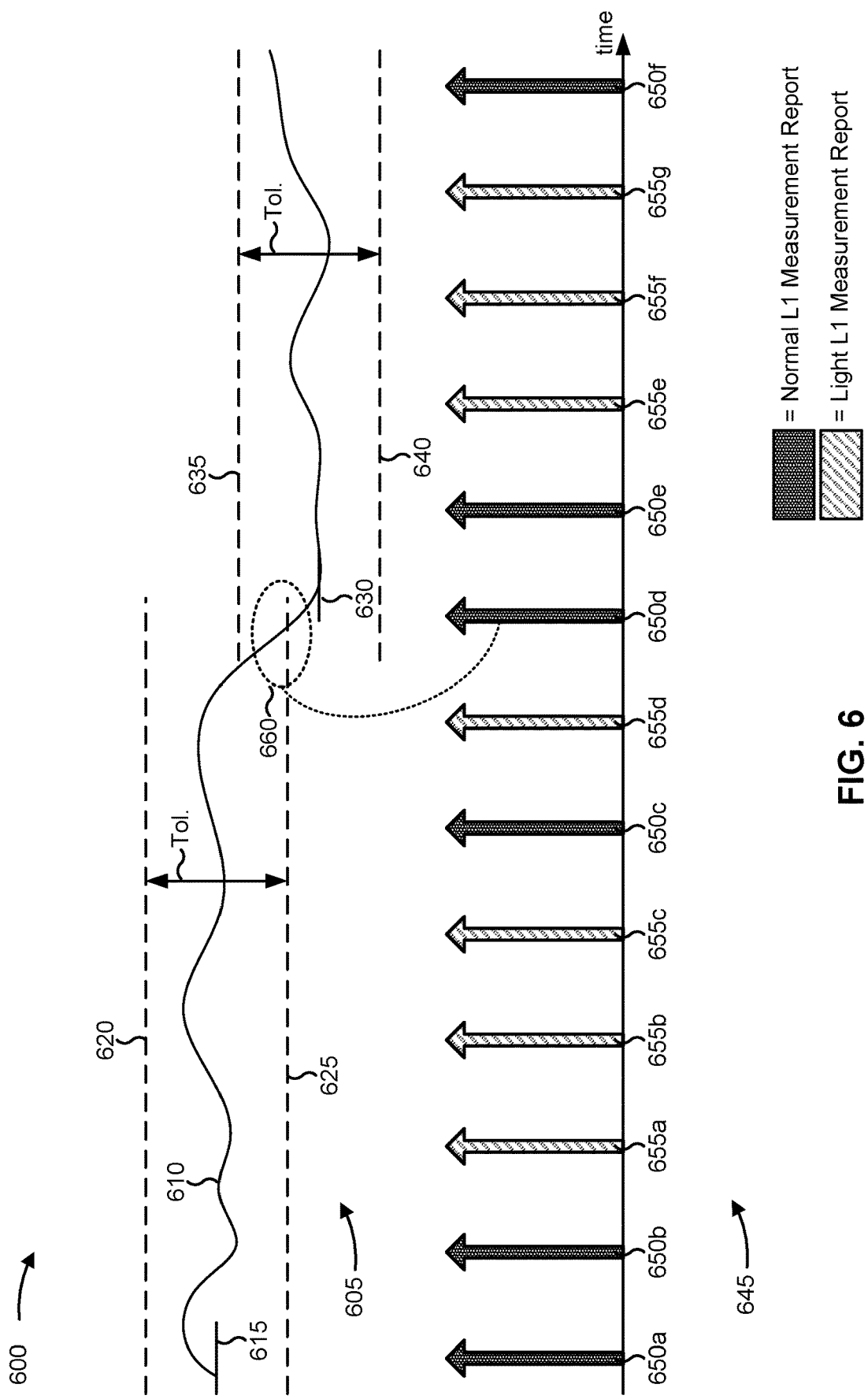
FIG. 6 is a diagram illustrating an example of light layer 1 (L1) measurement reporting procedures, in accordance with the present disclosure.

FIG. 6 is a diagram illustrating an example 600 of light L1 measurement reporting procedures, in accordance with the present disclosure.

As shown by the plot indicated by reference number 605, a UE 120 may perform an L1 measurement (sometimes referred to herein as measuring an L1 parameter), such as an L1-RSRP measurement, an L1-SINR measurement, or the like, with the curve indicated by reference number 610 representing the L1 measurement over time. As shown, the L1 measurement may fluctuate over time. The UE 120 may be configured with CSI-RS resources or the like for performing various instances of the L1 measurement, such as via a CSI report setting received from a network entity 110, as described in connection with FIGS. 4 and 5. In some aspects, a UE 120 may perform an initial measurement of the L1 parameter, indicated by reference number 615, and may thereafter perform periodic, semi-persistent, or aperiodic measurements of the L1 parameter according to the configuration received from the network entity 110.

In some aspects, the UE 120 may determine an L1 measurement tolerance (shown as "Tol." in FIG. 6) based at least in part on the initial measurement of the L1 parameter. The L1 measurement tolerance may be defined by an upper threshold, shown by reference number 620, and by a lower threshold, shown by reference number 625. The upper threshold and the lower threshold may be determined based at least in part on the initial measurement of the L1 parameter. For example, the upper threshold and/or the lower threshold may be configured to be located at a certain offset from the initial measurement of the L1 parameter, shown by reference number 615.

The UE 120 may periodically determine different L1 measurement tolerances (e.g., different upper thresholds and/or lower thresholds) based at least in part on the measured L1 parameter exceeding the initially determined upper threshold or falling below the initially determined lower threshold. For example, as shown by reference number 630, the measurement of the L1 parameter may fall below the initially determined lower threshold (shown by reference number 625). Thus, the UE 120 may determine another L1 measurement tolerance, which is defined by a new upper threshold, as shown by reference number 635, and a new lower threshold, as shown by reference number 640. The new upper threshold and the new lower threshold may be determined based at least in part on the measurement of the L1 parameter indicated at reference number 630. For example, the new upper threshold and/or the new lower threshold may be configured to be located at a certain offset from the measurement of the L1 parameter, which may be the same offset that was used to determine the initially determined upper threshold and/or lower threshold.

As shown by reference number 645, the UE 120 may transmit, to the network entity 110, L1 measurement reports based at least in part on the measurements of the L1 parameter and/or based at least in part on a configuration of the L1 measurement reports (e.g., one or more CSI reporting settings) received from the network entity 110. In some aspects, the UE 120 may transmit normal L1 measurement reports, as indicated by reference numbers 650a-f, and, in some other aspects, the UE 120 may transmit light L1 measurement reports, as indicated by reference numbers 655a-g. A normal L1 measurement report may be an L1 measurement report containing information typically transmitted to a network entity 110 under legacy reporting procedures, such as one or more CSI indexes and associated measurements (e.g., L1-RSRP measurements and/or L1-SINR measurements, among other examples), one or more CQIs, one or more PMIs, one or more CRIs, one or more LIs, one or more RIs, or the like.

On the other hand, a light L1 measurement report may be based at least in part on (e.g., may rely on and/or indicate certain information relative to) a previously transmitted normal L1 measurement report and thus may omit certain information as compared to a normal L1 measurement report and/or may transmit different information than a normal L1 measurement report. The light L1 measurement report may be used to indicate to the network entity 110 that an L1 measurement and/or related parameters have little or no change from a previously transmitted normal L1 measurement report, without including all information sent in a normal L1 measurement report. In that way, a light L1 measurement report may be associated with a smaller payload and reduced overhead as compared to a normal L1 measurement report. For example, in some aspects, if a measurement of an L1 parameter has little or no change from a measurement included in a previously transmitted normal L1 measurement report, the UE 120 may transmit a light L1 measurement report that indicates the small change (e.g., that signals an offset from a previously transmitted measurement), that signals "no change," or the like. Additionally, or alternatively, in some aspects, the light L1 measurement report may indicate one or more actual L1 measurements and/or one or more reference signal indexes, while, in some other aspects, the light L1 measurement report may omit one or more actual L1 measurements and/or one or more reference signal indexes.

In some aspects, a UE 120 may transmit the light L1 measurement report in response to one or more light L1 measurement report conditions being satisfied. For example, one light L1 measurement report condition may be that an L1 measurement (e.g., L1-RSRP and/or L1-SINR) is within a measurement tolerance (e.g., "Tol." in FIG. 6) as compared to a measurement associated with a previously transmitted normal L1 measurement report. More particularly, the UE 120 may perform an initial L1 measurement (indicated by reference number 615) and transmit a normal L1 measurement report to a network entity 110, accordingly (indicated by reference number 650a). Moreover, in some aspects, the UE 120 may be configured to send multiple consecutive normal L1 measurement reports to the network entity 110 prior to transmitting any light L1 measurement reports. For example, if the network entity 110 determines that there may be some probability that an initial normal L1 measurement report (e.g., the normal L1 measurement report shown by reference number 650a) does not reach the network entity 110, which may render any subsequently sent light L1 measurement report useless to the network entity 110, the UE 120 may be configured to transmit a configurable number (in the depicted example, two) of normal L1 measurement reports to the network entity 110 prior to transmitting any light L1 measurement reports. Thus, as shown by reference numbers 650a and 650b, in the depicted example the UE 120 may transmit two consecutive normal L1 measurement reports.

As shown by reference number 655a, the UE 120 may thereafter transmit light L1 measurement reports so long as certain light L1 measurement report conditions are met. For example, in response to determining that the measured L1 parameter is within the L1 measurement tolerance (e.g., in response to determining that the measured L1 parameter does not exceed the upper threshold indicated by reference number 620 and does not fall below the lower threshold indicated by reference number 625), the UE 120 may transmit a light L1 measurement report, as indicated by reference numbers 655a-d. Again, the light L1 measurement report may be associated with a reduced overhead as compared to a normal L1 measurement report and/or may include information that refers to information transmitted in a previously sent normal L1 measurement report and/or that is indicated relative to information transmitted in a previously sent normal L1 measurement report. In some aspects, the one or more light L1 measurement report conditions may apply to all measured resources, while, in some other aspects, the one or more light L1 measurement report conditions may only apply to a subset of the measured resources. For example, in some aspects, in order for the light L1 measurement report to be sent, the measurement of each of the received CSI-RSs must be within the tolerance shown in the plot at reference number 605, while, in some other aspects, in order for the light L1 measurement report to be sent, only the measurement of a highest CSI-RS of the received CSI-RSs must be within the tolerance shown in the plot at reference number 605, regardless of the measurement of other received CSI-RSs.

In some aspects, the UE 120 may be configured to transmit a normal L1 measurement report, even if the one or more light L1 measurement report conditions are met. For example, as shown by reference number 650c, the UE 120 may be configured to transmit a normal L1 measurement report after every configurable number (in the depicted example, three) of light L1 measurement reports, even if the one or more light L1 measurement conditions are still met. Thus, in the depicted example, the UE 120 may transmit a normal L1 measurement report (e.g., the normal L1 measurement report indicated by reference number 650c) between the third and fourth light L1 measurement reports (e.g., the light L1 measurement reports indicated by reference numbers 655c and 655d).

In some aspects, the UE 120 may continue in this fashion (e.g., transmitting light L1 measurement reports and, optionally, transmitting a normal L1 measurement report every configurable number of the light L1 measurement reports) as long as the one or more light L1 measurement report conditions are met. However, when channel conditions change and/or when the one or more light L1 measurement report conditions are no longer satisfied, the UE 120 may transmit a normal L1 measurement report in order to provide the network entity with new CSI and related information for the changing channel. For example, as indicated by reference number 660, the measurement of the L1 parameter may fall outside of the tolerance, such as by falling below the lower threshold indicated by reference number 625. In that regard, the UE 120 may determine a new tolerance based at least in part on the measurement indicated by reference number 630, as described above.

Moreover, based at least in part on the one or more light L1 measurement conditions no longer being satisfied (e.g., based at least in part on the L1 measurements differing from a previous L1 measurement by more than a threshold amount), the UE 120 may transmit a normal L1 measurement report, as indicated by 650d. The normal L1 measurement report may provide the network entity with updated CSI in light of the changing channel conditions (e.g., in light of the L1 measurement dropping by more than a threshold amount). Moreover, and as described above in connection with reference number 650b, in aspects in which the UE 120 is configured to transmit a configurable number (in the depicted example, two) of normal L1 measurement reports to the network entity 110 prior to transmitting any light L1 measurement reports, the UE 120 may transmit two consecutive normal L1 measurement reports in response to the changing channel conditions, as shown by reference numbers 650d and 650e. Thereafter, if the one or more light L1 measurement conditions are satisfied, the UE 120 may transmit light L1 measurement reports, as shown by reference numbers 655e-g. Moreover, in aspects in which the UE 120 is configured to transmit a normal L1 measurement report after every configurable number (in the depicted example, three) of light L1 measurement reports, the UE 120 may transmit a normal L1 measurement report, as shown by reference number 650f, even if the one or more light L1 measurement conditions are still met.

In some aspects, the network entity 110 may configure the UE 120 to transmit additional normal L1 measurement reports, even if the one or more light L1 measurement report conditions are met. For example, in response to at least one of the network entity 110 or the UE 120 detecting that a beam failure may be imminent, the network entity 110 may configure the UE 120 to transmit one or more normal L1 measurement reports so that the network entity 110 can receive CSI associated with other beams in preparation of switching transmit beams, or the like. Additionally, or alternatively, if L1 measurements fall below a certain threshold, indicating a relatively weak connection, the network entity 110 may configure the UE 120 to transmit one or more normal L1 measurement reports so that the network entity 110 can receive CSI associated with other beams in preparation of providing a stronger connection, or the like. Additionally, or alternatively, if an L1 measurement report payload satisfies a certain threshold, the network entity 110 may configure the UE 120 to transmit one or more normal L1 measurement reports. For example, if a payload size of a normal L1 measurement report is below a certain threshold, thus indicating that the normal L1 measurement report is not associated with a large overhead, the network entity 110 may configure the UE 120 to transmit normal L1 measurement reports rather than light L1 measurement reports.

In some aspects, the UE 120 may indicate to the network entity 110 that an L1 measurement report (e.g., one of the measurement reports indicated by reference numbers 655a-g) is a light L1 measurement report. For example, the UE 120 may indicate to the network entity 110 that a light L1 measurement report is being utilized via a discontinuous transmission (DTX) (e.g., by transmitting no report). That is, in some aspects, if there is no change in L1 measurements from report to report, the UE 120 may simply transmit nothing in an L1 reporting occasion, which may indicate to the network entity 110 that the UE 120 is using a light L1 measurement report and/or that there has been no measurement change since a previously transmitted normal L1 measurement report. Additionally, or alternatively, the UE 120 may indicate to the network entity 110 that a light L1 measurement report is being used by utilizing a sequence-based transmission. That is, the UE 120 may transmit one or more signals in a specific sequence to indicate that a light L1 measurement report is being used, such as transmitting a certain sequence of DMRSs in an existing uplink channel (e.g., one of a PUSCH or a PUCCH).

Additionally, or alternatively, the UE 120 may indicate to the network entity 110 that a light L1 measurement report is being utilized based at least in part on a size of the L1 measurement report that is transmitted to the network entity 110. For example, the light L1 measurement report may be associated with a smaller number of resource blocks (RBs) than a normal L1 measurement report and/or a smaller number of symbols than a normal L1 measurement report. More particularly, for PUCCH formats with more than one RB, the light L1 measurement report may occupy fewer RBs than a normal L1 measurement report, indicating to the network entity 110 that a light L1 measurement report is being used. Similarly, for PUCCH formats with more than one symbol, the light L1 measurement report may occupy fewer symbols than a normal L1 measurement report, indicating to the network entity 110 that a light L1 measurement report is being used.

Additionally, or alternatively, the UE 120 may indicate to the network entity 110 that a light L1 measurement report is being used based at least in part on a format of an uplink channel used to transmit the L1 measurement report. For example, the UE 120 may transmit the light L1 measurement report using a PUCCH format that is different than a PUCCH format used to transmit a normal L1 measurement report. Additionally, or alternatively, the UE 120 may indicate to the network entity 110 that a light L1 measurement report is being used based at least in part on an indication provided in a communication used for a different uplink purpose. For example, the UE 120 may include an indication that a light L1 measurement report will be transmitted in a MAC-CE transmitted in a configured grant uplink resource, or the like.

Based at least in part on the UE 120 transmitting light L1 measurement reports, the UE 120 and/or the network entity 110 may conserve computing, power, network, and/or communication resources that may have otherwise been consumed transmitting only normal L1 measurement reports. For example, based at least in part on the UE 120 transmitting a light L1 measurement report when one or more light L1 measurement report conditions are met, the UE 120 and the network entity 110 may communicate with reduced overhead, which may conserve computing, power, network, and/or communication resources that may have otherwise been used to transmit normal L1 measurement reports, even when a channel is relatively static and/or L1 measurements have little or no change from report to report.

As indicated above, FIG. 6 is provided as an example. Other examples may differ from what is described with respect to FIG. 6.

Figure 7:
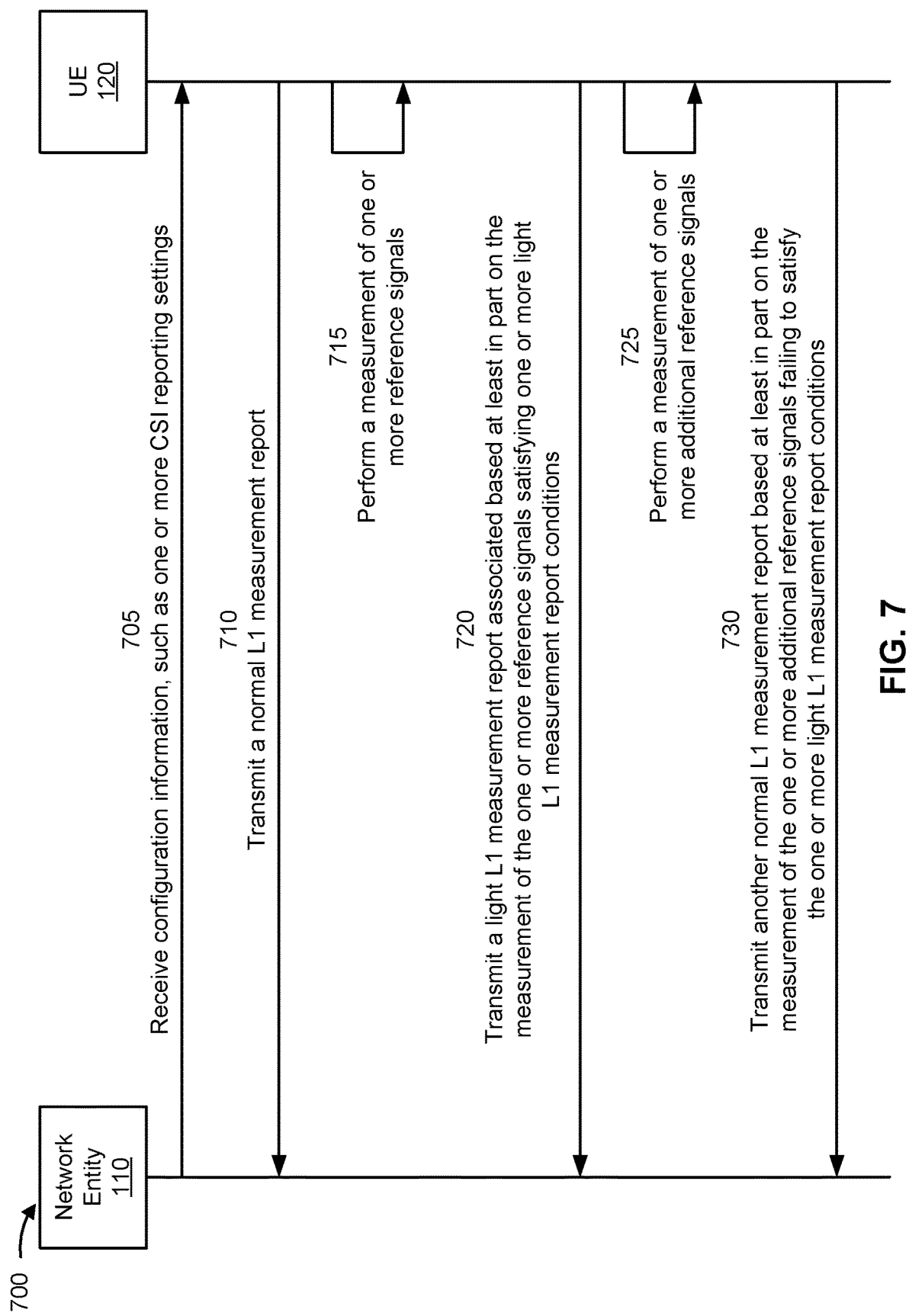
FIG. 7 is a diagram of an example associated with transmitting a light L1 measurement report, in accordance with the present disclosure.

FIG. 7 is a diagram of an example 700 associated with transmitting a light L1 measurement report, in accordance with the present disclosure. As shown in FIG. 7, a UE 120 and a network entity 110 may communicate with each other. In some aspects, the UE 120 and the network entity 110 may be part of a wireless network (e.g., wireless network 100). The UE 120 and the network entity 110 may have established a wireless connection prior to operations shown in FIG. 7, such as by using or more of the beam management procedures described in connection with FIG. 5.

As shown by reference number 705, the UE 120 may receive, from the network entity 110, configuration information. In some aspects, the UE 120 may receive the configuration information via one or more of RRC signaling, one or more MAC-CEs, and/or DCI, among other examples. In some aspects, the configuration information may include an indication of one or more configuration parameters (e.g., already known to the UE 120 and/or previously indicated by the network entity 110 or other network device) for selection by the UE 120, and/or explicit configuration information for the UE 120 to use to configure the UE 120, among other examples.

In some aspects, the configuration information may include a configuration of one or more CSI reports (e.g., one or more CSI reporting settings). As described above in connection with FIGS. 4-6, a configuration of one or more CSI reports may include a configuration of one or more CSI-RS resource sets for performing an L1 measurement (e.g., an L1-RSRP measurement, an L1-SINR measurement, or the like), and/or a configuration of one or more uplink resources for transmitting an L1 measurement report to the network entity 110 associated with the L1 measurements. In that regard, and as shown by reference number 710, the UE 120 may transmit, to the network entity 110, a normal L1 measurement report. For example, the UE 120 may measure one or more CSI-RSs or the like and transmit a corresponding normal L1 measurement report to the network entity 110, such as one of the normal L1 measurement reports described in connection with reference numbers 650a-f. The UE 120 may configure itself based at least in part on the configuration information. In some aspects, the UE 120 may be configured to perform one or more operations described herein based at least in part on the configuration information.

As shown by reference number 715, the UE 120 may perform a measurement of one or more reference signals associated with an L1 measurement report. For example, the UE 120 may perform an L1-RSRP measurement, an L1-SINR measurement, or the like. Moreover, and as shown by reference number 720, the UE 120 may transmit a light L1 measurement report associated with the measurement of the one or more reference signals based at least in part on the measurement of the one or more reference signals satisfying one or more light L1 measurement report conditions. As described in connection with FIG. 6, in some aspects the light L1 measurement report may be based at least in part on a previously transmitted normal L1 measurement report (e.g., the light L1 measurement report may be based at least in part on the normal L1 measurement report described in connection with reference number 710). Moreover, in some aspects, the light L1 measurement report may be associated with a reduced payload and/or a reduced overhead as compared to the normal L1 measurement report. More particularly, the light L1 measurement report may be associated with a reduced payload and/or a reduced overhead by omitting at least some information that was transmitted in the previously transmitted normal L1 measurement report, or by containing different information than the previously transmitted normal L1 measurement report. Moreover, in some aspects, the light L1 measurement report may include at least one of a reference signal measurement value or a reference signal index indication, while, in some other aspects, the light L1 measurement report may omit at least one of a reference signal measurement value or a reference signal index indication.

In some aspects, the one or more light L1 measurement report conditions may correspond to any of the conditions described above in connection with FIG. 6, or similar conditions. For example, the one or more light L1 measurement report conditions may include the measurement of the one or more reference signals (e.g., one or more CSI-RSs) differing from a measurement of one or more previously received reference signals by less than a threshold amount (e.g., by less than the upper threshold described in connection with reference numbers 620 and 635, and/or by less than the lower threshold described in connection with reference numbers 625 and 640). In some aspects, the measurement of the one or more previously received reference signals may be associated with the previously transmitted normal L1 measurement report (e.g., the normal L1 measurement report described in connection with reference number 710).

As described in connection with FIG. 6, the one or more light L1 measurement report conditions may apply to all measured resources, or else the one or more light L1 measurement report conditions may only apply to a subset of the measured resources. More particularly, the one or more reference signals may include multiple reference signals, and, in some aspects, the one or more light L1 measurement report conditions may include a measurement of each reference signal of the multiple reference signals differing from a measurement of a corresponding reference signal of the one or more previously received reference signals by less than the threshold amount. However, in some other aspects, the one or more light L1 measurement report conditions may include a measurement of a subset of reference signals of the multiple reference signals (e.g., a greatest CSI-RS) differing from a measurement of a corresponding subset of reference signals of the one or more previously received reference signals by less than the threshold amount.

As shown by reference number 725, in some aspects, the UE 120 may perform a measurement of one or more additional reference signals (e.g., one more additional CSI-RSs). Moreover, as shown by reference number 730, the UE 120 may transmit, to the network entity 110, another normal L1 measurement report associated with the measurement of the one or more additional reference signals based at least in part on the measurement of the one or more additional reference signals failing to satisfy the one or more light L1 measurement report conditions. For example, the UE 120 may transmit the normal L1 measurement report described in connection with reference number 650d in response to the L1 measurements falling below the lower threshold indicated by reference number 625.

In some aspects, the UE 120 may receive, from the network entity 110, a configuration indicating that one or more normal L1 measurement reports should be transmitted. For example, the UE 120 may receive a configuration indicating that one or more normal L1 measurement reports should be transmitted as part of the configuration information described in connection with reference number 705, or else the UE 120 may receive a configuration indicating that one or more normal L1 measurement reports should be transmitted in another configuration communication, such as another RRC message, MAC-CE message, DCI message, or the like.

In some aspects, the configuration indicating that one or more normal L1 measurement reports should be transmitted may indicate that a light L1 measurement report is permitted to be transmitted after a consecutive number of normal L1 measurement reports are transmitted. For example, the configuration may indicate that a light L1 measurement report (e.g., the light L1 measurement report described in connection with reference number 655a) may be transmitted after two consecutive normal L1 measurement reports are transmitted (e.g., the normal L1 measurement reports described in connection with reference numbers 650a and 650b). Additionally, or alternatively, the configuration indicating that one or more normal L1 measurement reports should be transmitted may indicate that a normal L1 measurement report should be transmitted after a consecutive number of light L1 measurement reports are transmitted. For example, the configuration may indicate that a normal L1 measurement report should be transmitted after three consecutive light L1 measurement reports are transmitted, as described in connection with the normal L1 measurement reports indicated by reference numbers 650c and 650f.

Additionally, or alternatively, the configuration indicating that one or more normal L1 measurement reports should be transmitted may indicate that a subsequently transmitted measurement report should be another normal L1 measurement report based on channel conditions, or the like. For example, the configuration may indicate that a subsequently transmitted measurement report should be another normal L1 measurement report based at least in part on a beam failure detection by the UE 120 and/or the network entity 110, a measurement of one or more reference signals not satisfying a measurement threshold, and/or a payload size associated with the subsequently transmitted measurement report satisfying a payload threshold, as described above in connection with FIG. 6.

In some aspects, the UE 120 may indicate to the network entity 110 that the light L1 measurement report described in connection with reference number 720 is being transmitted. More particularly, and as described in more detail in connection with FIG. 6, the light L1 measurement report may be indicated to the network entity 110 using at least one of a DTX, a communication including one or more signals transmitted in a specific sequence, a communication associated with a reduced number of RBs, a communication associated with a reduced number of symbols, a communication associated with a specific PUCCH format, or an indication provided in a communication used for a different purpose (e.g., a MAC-CE communication).

As indicated above, FIG. 7 is provided as an example. Other examples may differ from what is described with respect to FIG. 7.

Figure 8:
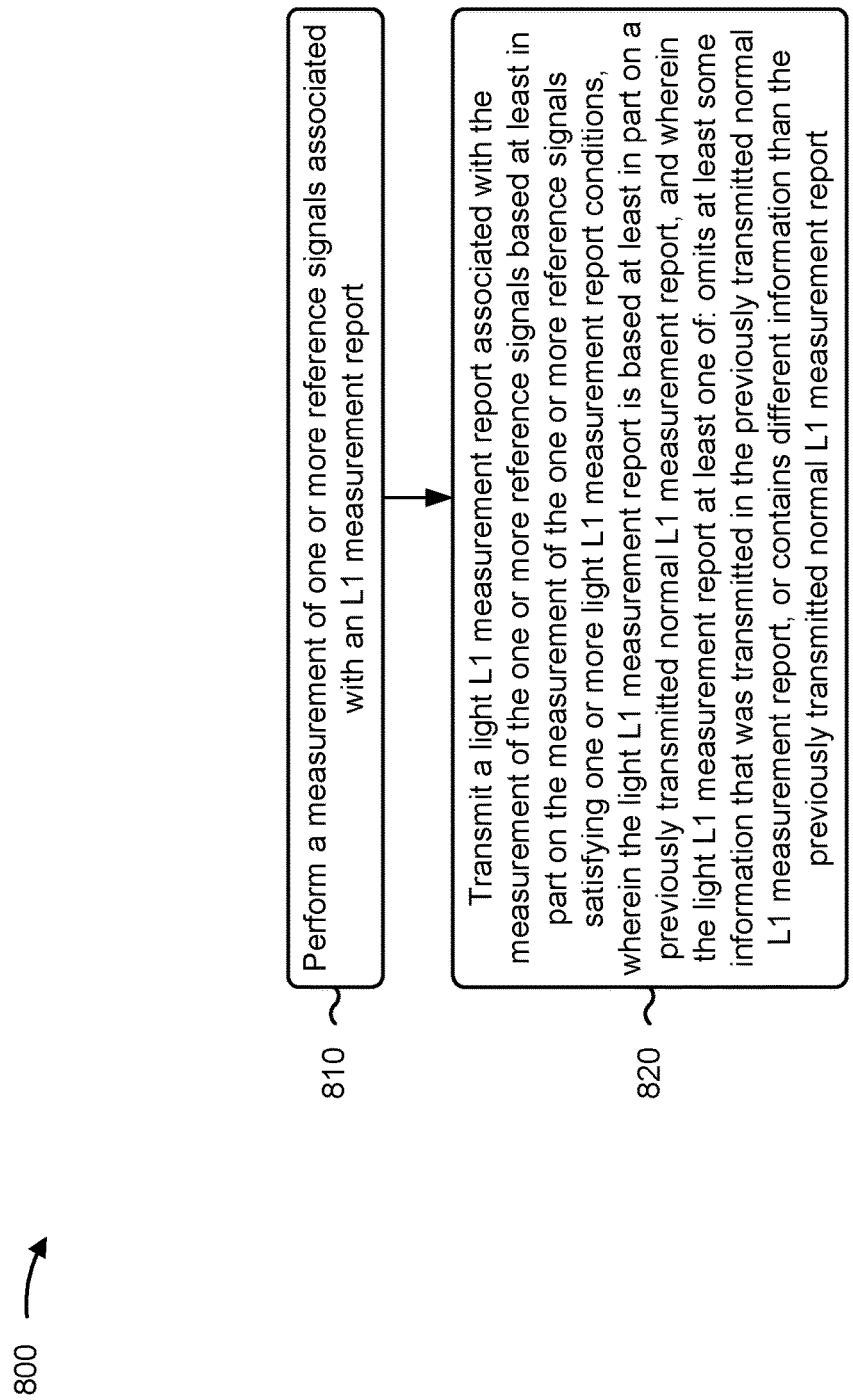
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with a light L1 measurement report.

As shown in FIG. 8, in some aspects, process 800 may include performing a measurement of one or more reference signals associated with an L1 measurement report (block 810). For example, the UE (e.g., using communication manager 1008 and/or measurement component 1010, depicted in FIG. 10) may perform a measurement of one or more reference signals associated with an L1 measurement report, as described above.

As further shown in FIG. 8, in some aspects, process 800 may include transmitting a light L1 measurement report associated with the measurement of the one or more reference signals based at least in part on the measurement of the one or more reference signals satisfying one or more light L1 measurement report conditions, wherein the light L1 measurement report is based at least in part on a previously transmitted normal L1 measurement report, and wherein the light L1 measurement report at least one of: omits at least some information that was transmitted in the previously transmitted normal L1 measurement report, or contains different information than the previously transmitted normal L1 measurement report (block 820). For example, the UE (e.g., using communication manager 1008 and/or transmission component 1004, depicted in FIG. 10) may transmit a light L1 measurement report associated with the measurement of the one or more reference signals based at least in part on the measurement of the one or more reference signals satisfying one or more light L1 measurement report conditions, wherein the light L1 measurement report is based at least in part on a previously transmitted normal L1 measurement report, and wherein the light L1 measurement report at least one of: omits at least some information that was transmitted in the previously transmitted normal L1 measurement report, or contains different information than the previously transmitted normal L1 measurement report, as described above.

Process 800 may include additional aspects, such as any single aspect or any combination of aspects described below and/or in connection with one or more other processes described elsewhere herein.

In a first aspect, the one or more light L1 measurement report conditions include the measurement of the one or more reference signals differing from a measurement of one or more previously received reference signals by less than a threshold amount, and the measurement of the one or more previously received reference signals is associated with the previously transmitted normal L1 measurement report.

In a second aspect, alone or in combination with the first aspect, the one or more reference signals include multiple reference signals, and the one or more light L1 measurement report conditions include a measurement of each reference signal of the multiple reference signals differing from a measurement of a corresponding reference signal of the one or more previously received reference signals by less than the threshold amount.

In a third aspect, alone or in combination with one or more of the first and second aspects, the one or more reference signals include multiple reference signals, and the one or more light L1 measurement report conditions include a measurement of a subset of reference signals of the multiple reference signals differing from a measurement of a corresponding subset of reference signals of the one or more previously received reference signals by less than the threshold amount.

In a fourth aspect, alone or in combination with one or more of the first through third aspects, process 800 includes performing a measurement of one or more additional reference signals, and transmitting another normal L1 measurement report associated with the measurement of the one or more additional reference signals based at least in part on the measurement of the one or more additional reference signals failing to satisfy the one or more light L1 measurement report conditions.

In a fifth aspect, alone or in combination with one or more of the first through fourth aspects, process 800 includes receiving a configuration indicating that one or more normal L1 measurement reports should be transmitted.

In a sixth aspect, alone or in combination with one or more of the first through fifth aspects, the configuration indicates that the light L1 measurement report is permitted to be transmitted after a consecutive number of normal L1 measurement reports are transmitted.

In a seventh aspect, alone or in combination with one or more of the first through sixth aspects, the configuration indicates that a normal L1 measurement report should be transmitted after a consecutive number of light L1 measurement reports are transmitted.

In an eighth aspect, alone or in combination with one or more of the first through seventh aspects, the light L1 measurement report includes at least one of a reference signal measurement value or a reference signal index indication.

In a ninth aspect, alone or in combination with one or more of the first through eighth aspects, the light L1 measurement report omits at least one of a reference signal measurement value or a reference signal index indication.

In a tenth aspect, alone or in combination with one or more of the first through ninth aspects, process 800 includes receiving a configuration indicating that a subsequently transmitted measurement report should be another normal L1 measurement report based at least in part on at least one of a beam failure detection, the measurement of one or more reference signals not satisfying a measurement threshold, or a payload size associated with the subsequently transmitted measurement report satisfying a payload threshold.

In an eleventh aspect, alone or in combination with one or more of the first through tenth aspects, process 800 includes indicating to a network entity that the light L1 measurement report is being transmitted.

In a twelfth aspect, alone or in combination with one or more of the first through eleventh aspects, the light L1 measurement report is indicated to the network entity using at least one of a discontinuous transmission, a communication including one or more signals transmitted in a specific sequence, a communication associated with a reduced number of resource blocks, a communication associated with a reduced number of symbols, a communication associated with a specific physical uplink control channel format, or an indication provided in a communication used for a different purpose.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
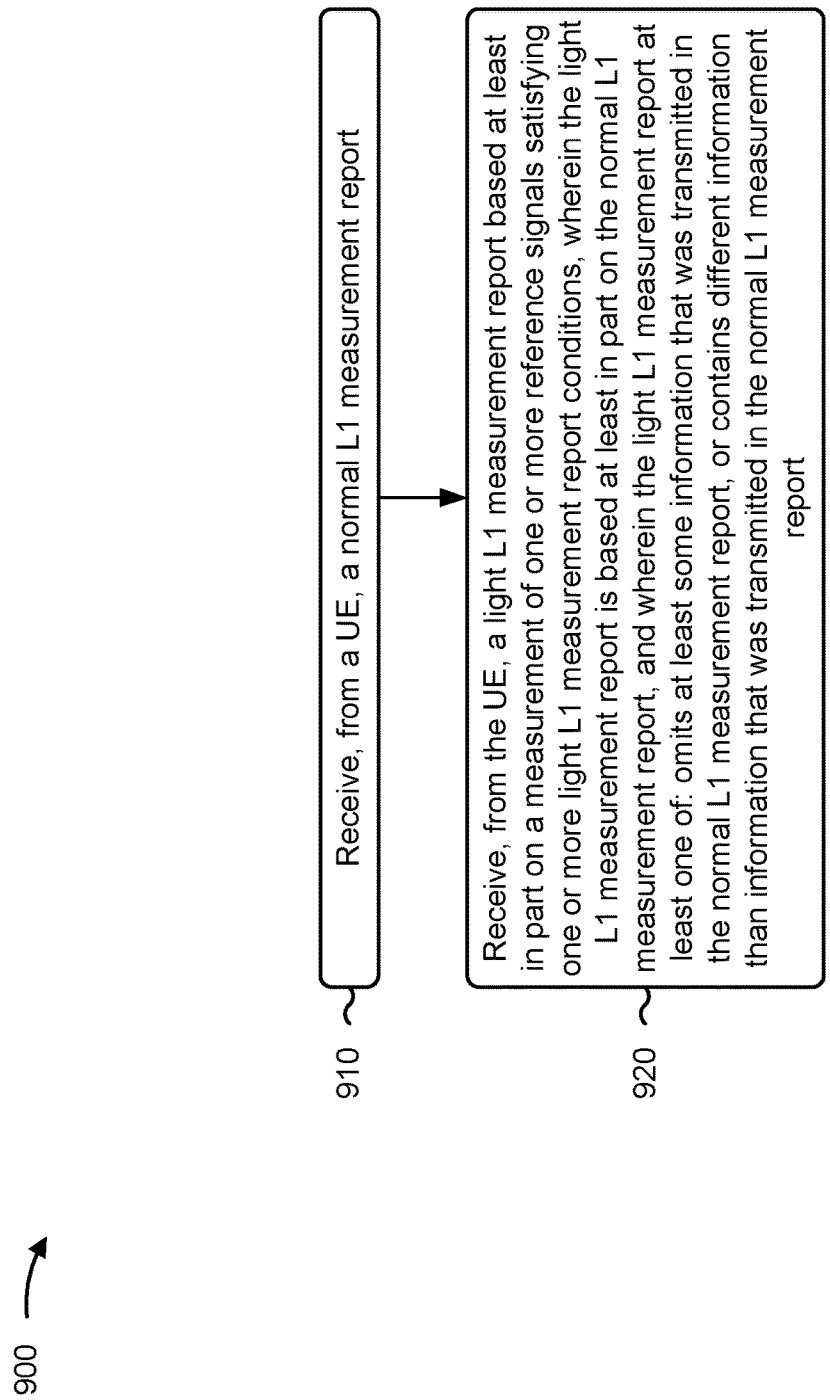
FIG. 9 is a diagram illustrating an example process performed, for example, by a network entity, in accordance with the present disclosure.

FIG. 9 is a diagram illustrating an example process 900 performed, for example, by a network entity, in accordance with the present disclosure. Example process 900 is an example where the network entity (e.g., network entity 110) performs operations associated with a light layer 1 measurement report.

As shown in FIG. 9, in some aspects, process 900 may include receiving, from a UE, a normal L1 measurement report (block 910). For example, the network entity (e.g., using communication manager 1108 and/or reception component 1102, depicted in FIG. 11) may receive, from a UE, a normal L1 measurement report, as described above.

As further shown in FIG. 9, in some aspects, process 900 may include receiving, from the UE, a light L1 measurement report based at least in part on a measurement of one or more reference signals satisfying one or more light L1 measurement report conditions, wherein the light L1 measurement report is based at least in part on the normal L1 measurement report, and wherein the light L1 measurement report at least one of: omits at least some information that was transmitted in the normal L1 measurement report, or contains different information than information that was transmitted in the normal L1 measurement report (block 920). For example, the network entity (e.g., using communication manager 1108 and/or reception component 1102, depicted in FIG. 11) may receive, from the UE, a light L1 measurement report based at least in part on a measurement of one or more reference signals satisfying one or more light L1 measurement report conditions, wherein the light L1 measurement report is based at least in part on the normal L1 measurement report, and wherein the light L1 measurement report at least one of: omits at least some information that was transmitted in the normal L1 measurement report, or contains different information than information that was transmitted in the normal L1 measurement report, as described above.

Process 900 may include additional aspects, such as any single aspect or any combination of aspects described below and/or in connection with one or more other processes described elsewhere herein.

In a first aspect, the one or more light L1 measurement report conditions include the measurement of the one or more reference signals differing from a measurement of one or more previously transmitted reference signals by less than a threshold amount, and the measurement of the one or more previously transmitted reference signals is associated with the normal L1 measurement report.

In a second aspect, alone or in combination with the first aspect, the one or more reference signals include multiple reference signals, and the one or more light L1 measurement report conditions include a measurement of each reference signal of the multiple reference signals differing from a measurement of a corresponding reference signal of the one or more previously transmitted reference signals by less than the threshold amount.

In a third aspect, alone or in combination with one or more of the first and second aspects, the one or more reference signals include multiple reference signals, and the one or more light L1 measurement report conditions include a measurement of a subset of reference signals of the multiple reference signals differing from a measurement of a corresponding subset of reference signals of the one or more previously transmitted reference signals by less than the threshold amount.

In a fourth aspect, alone or in combination with one or more of the first through third aspects, process 900 includes receiving, from the UE, another normal L1 measurement report associated with a measurement of one or more additional reference signals based at least in part on the measurement of the one or more additional reference signals failing to satisfy the one or more light L1 measurement report conditions.

In a fifth aspect, alone or in combination with one or more of the first through fourth aspects, process 900 includes transmitting, to the UE, a configuration indicating that one or more normal L1 measurement reports should be transmitted.

In a sixth aspect, alone or in combination with one or more of the first through fifth aspects, the configuration indicates that the light L1 measurement report is permitted to be transmitted after a consecutive number of normal L1 measurement reports are transmitted.

In a seventh aspect, alone or in combination with one or more of the first through sixth aspects, the configuration indicates that another normal L1 measurement report should be transmitted after a consecutive number of light L1 measurement reports are transmitted.

In an eighth aspect, alone or in combination with one or more of the first through seventh aspects, the light L1 measurement report includes at least one of a reference signal measurement value or a reference signal index indication.

In a ninth aspect, alone or in combination with one or more of the first through eighth aspects, the light L1 measurement report omits at least one of a reference signal measurement value or a reference signal index indication.

In a tenth aspect, alone or in combination with one or more of the first through ninth aspects, process 900 includes transmitting, to the UE, a configuration indicating that a subsequently transmitted measurement report should be another normal L1 measurement report based at least in part on at least one of a beam failure detection, the measurement of one or more reference signals not satisfying a measurement threshold, or a payload size associated with the subsequently transmitted measurement report satisfying a payload threshold.

In an eleventh aspect, alone or in combination with one or more of the first through tenth aspects, process 900 includes receiving, from the UE, an indication that the light L1 measurement report is being transmitted.

In a twelfth aspect, alone or in combination with one or more of the first through eleventh aspects, the indication that the light L1 measurement report is being transmitted is associated with at least one of a discontinuous transmission, a communication including one or more signals transmitted in a specific sequence, a communication associated with a reduced number of resource blocks, a communication associated with a reduced number of symbols, a communication associated with a specific physical uplink control channel format, or an indication provided in a communication used for a different purpose.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
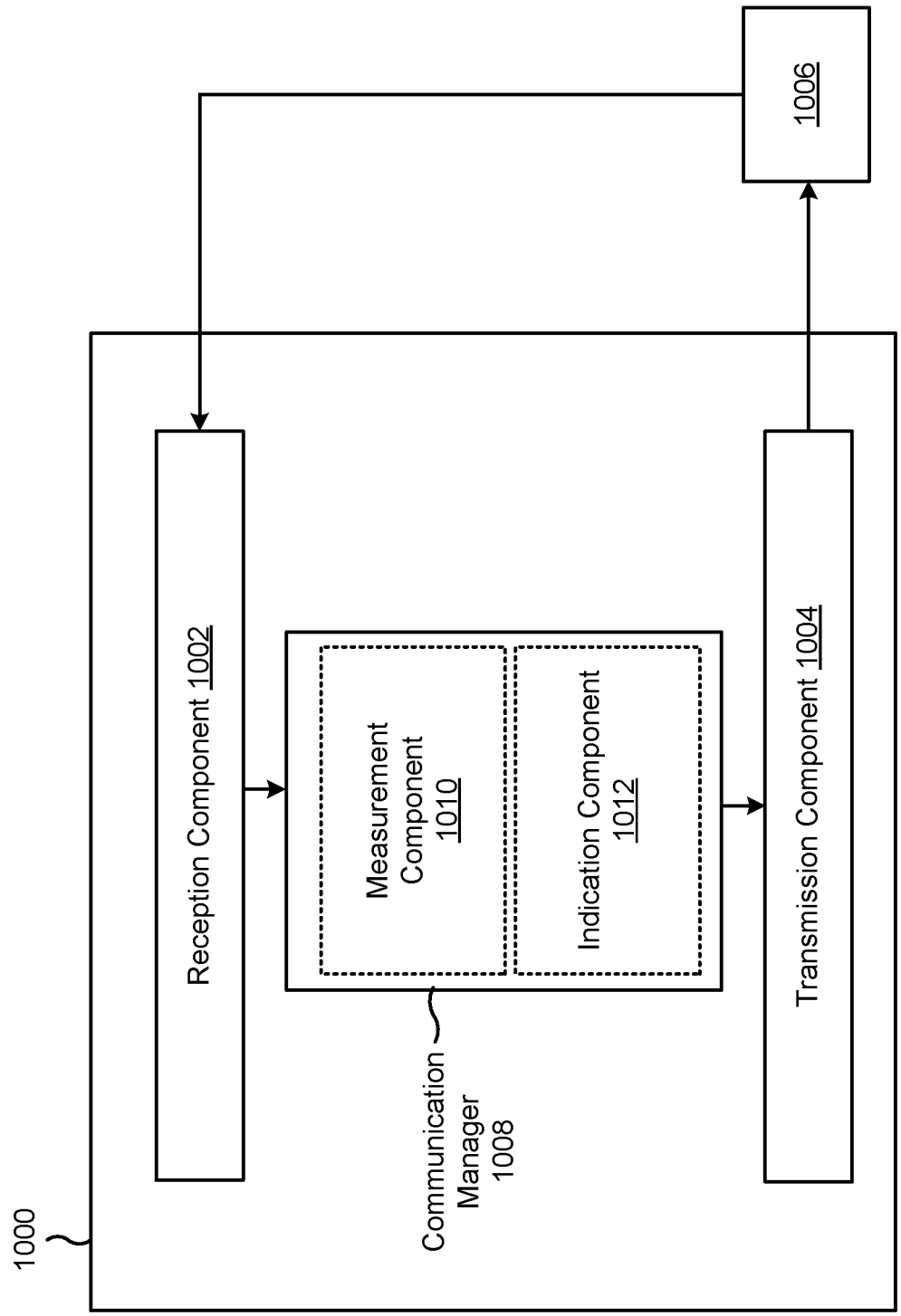
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE (e.g., UE 120), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008 (e.g., communication manager 140). The communication manager 1008 may include a measurement component 1010 and/or an indication component 1012, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8.

In some aspects, the apparatus 1000 and/or one or more components shown in FIG. 10 may include one or more components of the UE 120 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE 120 described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE 120 described in connection with FIG. 2. In some aspects, the transmission component 1004 may be co-located with the reception component 1002 in a transceiver.

The measurement component 1010 may perform a measurement of one or more reference signals associated with an L1 measurement report. The transmission component 1004 may transmit a light L1 measurement report associated with the measurement of the one or more reference signals based at least in part on the measurement of the one or more reference signals satisfying one or more light L1 measurement report conditions, wherein the light L1 measurement report is based at least in part on a previously transmitted normal L1 measurement report, and wherein the light L1 measurement report at least one of omits at least some information that was transmitted in the previously transmitted normal L1 measurement report, or contains different information than the previously transmitted normal L1 measurement report.

The measurement component 1010 may perform a measurement of one or more additional reference signals. The transmission component 1004 may transmit another normal L1 measurement report associated with the measurement of the one or more additional reference signals based at least in part on the measurement of the one or more additional reference signals failing to satisfy the one or more light L1 measurement report conditions.

The reception component 1002 may receive a configuration indicating that one or more normal L1 measurement reports should be transmitted. The reception component 1002 may receive a configuration indicating that a subsequently transmitted measurement report should be another normal L1 measurement report based at least in part on at least one of a beam failure detection, the measurement of one or more reference signals not satisfying a measurement threshold, or a payload size associated with the subsequently transmitted measurement report satisfying a payload threshold. The indication component 1012 may indicate to a network entity that the light L1 measurement report is being transmitted.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
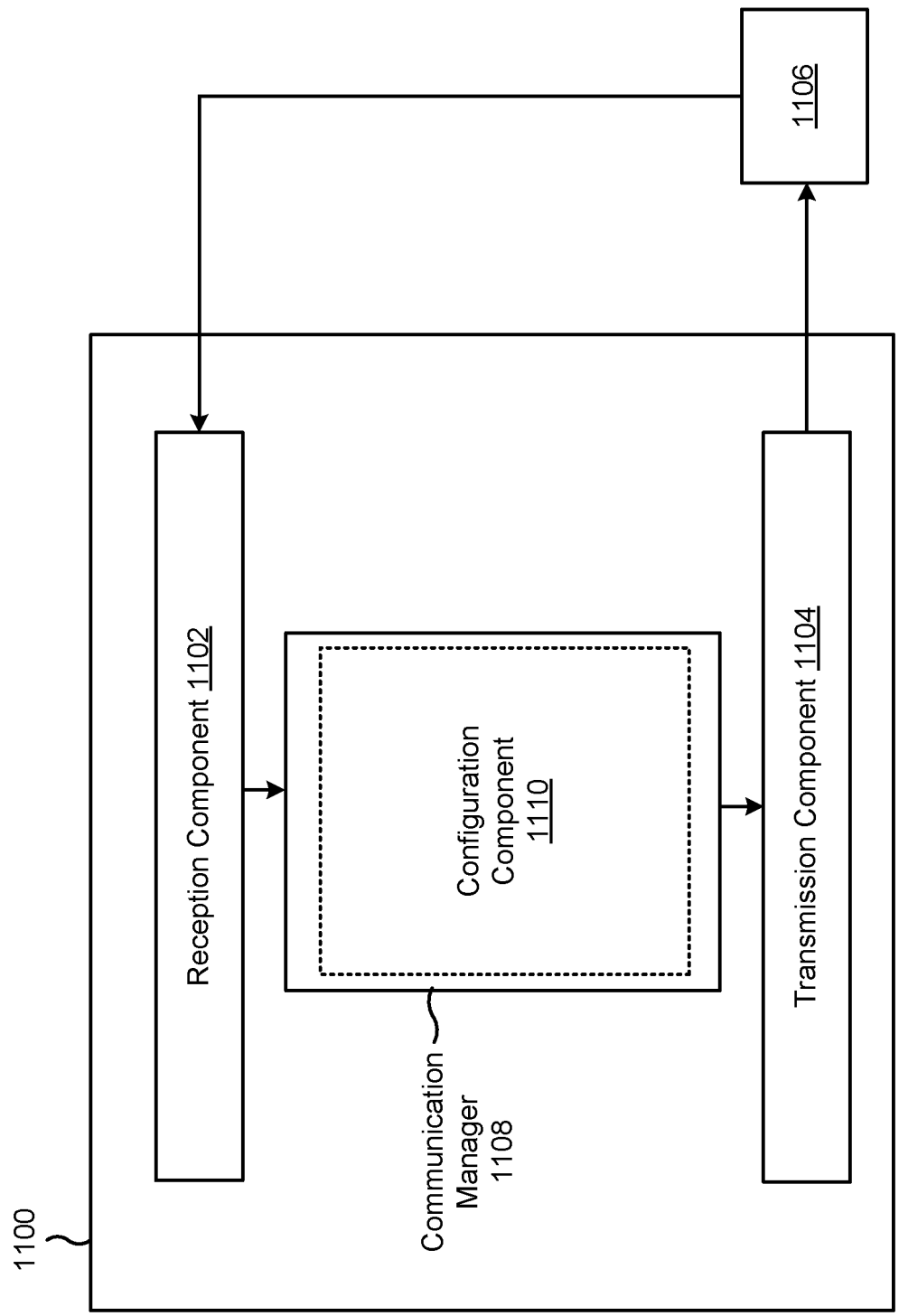
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network entity (e.g., network entity 110), or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108 (e.g., communication manager 150). The communication manager 1108 may include a configuration component 1110, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network entity 110 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network entity 110 described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network entity 110 described in connection with FIG. 2. In some aspects, the transmission component 1104 may be co-located with the reception component 1102 in a transceiver.

The reception component 1102 may receive, from a UE (e.g., UE 120), a normal L1 measurement report. The reception component 1102 may receive, from the UE, a light L1 measurement report based at least in part on a measurement of one or more reference signals satisfying one or more light L1 measurement report conditions, wherein the light L1 measurement report is based at least in part on the normal L1 measurement report, and wherein the light L1 measurement report at least one of omits at least some information that was transmitted in the normal L1 measurement report, or contains different information than information that was transmitted in the normal L1 measurement report.

The reception component 1102 may receive, from the UE, another normal L1 measurement report associated with a measurement of one or more additional reference signals based at least in part on the measurement of the one or more additional reference signals failing to satisfy the one or more light L1 measurement report conditions. The reception component 1102 may receive, from the UE, an indication that the light L1 measurement report is being transmitted.

The transmission component 1104 and/or the configuration component 1110 may transmit, to the UE, a configuration indicating that one or more normal L1 measurement reports should be transmitted. The transmission component 1104 and/or the configuration component 1110 may transmit, to the UE, a configuration indicating that a subsequently transmitted measurement report should be another normal L1 measurement report based at least in part on at least one of a beam failure detection, the measurement of one or more reference signals not satisfying a measurement threshold, or a payload size associated with the subsequently transmitted measurement report satisfying a payload threshold.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: performing a measurement of one or more reference signals associated with an L1 measurement report; and transmitting a light L1 measurement report associated with the measurement of the one or more reference signals based at least in part on the measurement of the one or more reference signals satisfying one or more light L1 measurement report conditions, wherein the light L1 measurement report is based at least in part on a previously transmitted normal L1 measurement report, and wherein the light L1 measurement report at least one of: omits at least some information that was transmitted in the previously transmitted normal L1 measurement report, or contains different information than the previously transmitted normal L1 measurement report.

Aspect 2: The method of Aspect 1, wherein the one or more light L1 measurement report conditions include the measurement of the one or more reference signals differing from a measurement of one or more previously received reference signals by less than a threshold amount, wherein the measurement of the one or more previously received reference signals is associated with the previously transmitted normal L1 measurement report.

Aspect 3: The method of Aspect 2, wherein the one or more reference signals include multiple reference signals, and wherein the one or more light L1 measurement report conditions include a measurement of each reference signal of the multiple reference signals differing from a measurement of a corresponding reference signal of the one or more previously received reference signals by less than the threshold amount.

Aspect 4: The method of Aspect 2, wherein the one or more reference signals include multiple reference signals, and wherein the one or more light L1 measurement report conditions include a measurement of a subset of reference signals of the multiple reference signals differing from a measurement of a corresponding subset of reference signals of the one or more previously received reference signals by less than the threshold amount.

Aspect 5: The method of any of Aspects 1-4, further comprising: performing a measurement of one or more additional reference signals; and transmitting another normal L1 measurement report associated with the measurement of the one or more additional reference signals based at least in part on the measurement of the one or more additional reference signals failing to satisfy the one or more light L1 measurement report conditions.

Aspect 6: The method of any of Aspects 1-5, further comprising receiving a configuration indicating that one or more normal L1 measurement reports should be transmitted.

Aspect 7: The method of Aspect 6, wherein the configuration indicates that the light L1 measurement report is permitted to be transmitted after a consecutive number of normal L1 measurement reports are transmitted.

Aspect 8: The method of any of Aspects 6-7, wherein the configuration indicates that a normal L1 measurement report should be transmitted after a consecutive number of light L1 measurement reports are transmitted.

Aspect 9: The method of any of Aspects 1-8, wherein the light L1 measurement report includes at least one of a reference signal measurement value or a reference signal index indication.

Aspect 10: The method of any of Aspects 1-9, wherein the light L1 measurement report omits at least one of a reference signal measurement value or a reference signal index indication.

Aspect 11: The method of any of Aspects 1-10, further comprising receiving a configuration indicating that a subsequently transmitted measurement report should be another normal L1 measurement report based at least in part on at least one of: a beam failure detection, the measurement of one or more reference signals not satisfying a measurement threshold, or a payload size associated with the subsequently transmitted measurement report satisfying a payload threshold.

Aspect 12: The method of any of Aspects 1-11, further comprising indicating to a network entity that the light L1 measurement report is being transmitted.

Aspect 13: The method of Aspect 12, wherein the light L1 measurement report is indicated to the network entity using at least one of: a discontinuous transmission, a communication including one or more signals transmitted in a specific sequence, a communication associated with a reduced number of resource blocks, a communication associated with a reduced number of symbols, a communication associated with a specific physical uplink control channel format, or an indication provided in a communication used for a different purpose.

Aspect 14: A method of wireless communication performed by a network entity, comprising: receiving, from a UE, a normal L1 measurement report; and receiving, from the UE, a light L1 measurement report based at least in part on a measurement of one or more reference signals satisfying one or more light L1 measurement report conditions, wherein the light L1 measurement report is based at least in part on the normal L1 measurement report, and wherein the light L1 measurement report at least one of: omits at least some information that was transmitted in the normal L1 measurement report, or contains different information than information that was transmitted in the normal L1 measurement report.

Aspect 15: The method of Aspect 14, wherein the one or more light L1 measurement report conditions include the measurement of the one or more reference signals differing from a measurement of one or more previously transmitted reference signals by less than a threshold amount, wherein the measurement of the one or more previously transmitted reference signals is associated with the normal L1 measurement report.

Aspect 16: The method of Aspect 15, wherein the one or more reference signals include multiple reference signals, and wherein the one or more light L1 measurement report conditions include a measurement of each reference signal of the multiple reference signals differing from a measurement of a corresponding reference signal of the one or more previously transmitted reference signals by less than the threshold amount.

Aspect 17: The method of Aspect 15, wherein the one or more reference signals include multiple reference signals, and wherein the one or more light L1 measurement report conditions include a measurement of a subset of reference signals of the multiple reference signals differing from a measurement of a corresponding subset of reference signals of the one or more previously transmitted reference signals by less than the threshold amount.

Aspect 18: The method of any of Aspects 14-17, further comprising receiving, from the UE, another normal L1 measurement report associated with a measurement of one or more additional reference signals based at least in part on the measurement of the one or more additional reference signals failing to satisfy the one or more light L1 measurement report conditions.

Aspect 19: The method of any of Aspects 14-18, further comprising transmitting, to the UE, a configuration indicating that one or more normal L1 measurement reports should be transmitted.

Aspect 20: The method of Aspect 19, wherein the configuration indicates that the light L1 measurement report is permitted to be transmitted after a consecutive number of normal L1 measurement reports are transmitted.

Aspect 21: The method of any of Aspects 19-20, wherein the configuration indicates that another normal L1 measurement report should be transmitted after a consecutive number of light L1 measurement reports are transmitted.

Aspect 22: The method of any of Aspects 14-21, wherein the light L1 measurement report includes at least one of a reference signal measurement value or a reference signal index indication.

Aspect 23: The method of any of Aspects 14-22, wherein the light L1 measurement report omits at least one of a reference signal measurement value or a reference signal index indication.

Aspect 24: The method of any of Aspects 14-23, further comprising transmitting, to the UE, a configuration indicating that a subsequently transmitted measurement report should be another normal L1 measurement report based at least in part on at least one of: a beam failure detection, the measurement of one or more reference signals not satisfying a measurement threshold, or a payload size associated with the subsequently transmitted measurement report satisfying a payload threshold.

Aspect 25: The method of any of Aspects 14-24, further comprising receiving, from the UE, an indication that the light L1 measurement report is being transmitted.

Aspect 26: The method of Aspect 25, wherein the indication that the light L1 measurement report is being transmitted is associated with at least one of: a discontinuous transmission, a communication including one or more signals transmitted in a specific sequence, a communication associated with a reduced number of resource blocks, a communication associated with a reduced number of symbols, a communication associated with a specific physical uplink control channel format, or an indication provided in a communication used for a different purpose.

Aspect 27: An apparatus for wireless communication at a device, comprising a processor; memory coupled with the processor; and instructions stored in the memory and executable by the processor to cause the apparatus to perform the method of one or more of Aspects 1-13.

Aspect 28: A device for wireless communication, comprising a memory and one or more processors coupled to the memory, the one or more processors configured to perform the method of one or more of Aspects 1-13.

Aspect 29: An apparatus for wireless communication, comprising at least one means for performing the method of one or more of Aspects 1-13.

Aspect 30: A non-transitory computer-readable medium storing code for wireless communication, the code comprising instructions executable by a processor to perform the method of one or more of Aspects 1-13.

Aspect 31: A non-transitory computer-readable medium storing a set of instructions for wireless communication, the set of instructions comprising one or more instructions that, when executed by one or more processors of a device, cause the device to perform the method of one or more of Aspects 1-13.

Aspect 32: An apparatus for wireless communication at a device, comprising a processor; memory coupled with the processor; and instructions stored in the memory and executable by the processor to cause the apparatus to perform the method of one or more of Aspects 14-26.

Aspect 33: A device for wireless communication, comprising a memory and one or more processors coupled to the memory, the one or more processors configured to perform the method of one or more of Aspects 14-26.

Aspect 34: An apparatus for wireless communication, comprising at least one means for performing the method of one or more of Aspects 14-26.

Aspect 35: A non-transitory computer-readable medium storing code for wireless communication, the code comprising instructions executable by a processor to perform the method of one or more of Aspects 14-26.

Aspect 36: A non-transitory computer-readable medium storing a set of instructions for wireless communication, the set of instructions comprising one or more instructions that, when executed by one or more processors of a device, cause the device to perform the method of one or more of Aspects 14-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      perform a measurement of one or more reference signals associated with a layer 1 (L1) measurement report; and
      transmit a light L1 measurement report associated with the measurement of the one or more reference signals based at least in part on;
         a configuration of the UE indicating that:
            the light L1 measurement report is permitted to be transmitted after a consecutive number of normal L1 measurement reports are transmitted, or
            a normal L1 measurement report should be transmitted after a consecutive number of light L1 measurement reports are transmitted, and
         the measurement of the one or more reference signals satisfying one or more light L1 measurement report conditions, wherein the light L1 measurement report is based at least in part on a previously transmitted normal L1 measurement report, and wherein the light L1 measurement report at least one of:

omits at least some information that was transmitted in the previously transmitted normal L1 measurement report, or contains different information than the previously transmitted normal L1 measurement report.

2. The apparatus of claim 1, wherein the one or more light L1 measurement report conditions include the measurement of the one or more reference signals differing from a measurement of one or more previously received reference signals by less than a threshold amount, wherein the measurement of the one or more previously received reference signals is associated with the previously transmitted normal L1 measurement report.

3. The apparatus of claim 2, wherein the one or more reference signals include multiple reference signals, and wherein the one or more light L1 measurement report conditions include a measurement of each reference signal of the multiple reference signals differing from a measurement of a corresponding reference signal of the one or more previously received reference signals by less than the threshold amount.

4. The apparatus of claim 2, wherein the one or more reference signals include multiple reference signals, and wherein the one or more light L1 measurement report conditions include a measurement of a subset of reference signals of the multiple reference signals differing from a measurement of a corresponding subset of reference signals of the one or more previously received reference signals by less than the threshold amount.

5. The apparatus of claim 1, wherein the one or more processors are further configured to:

perform a measurement of one or more additional reference signals; and transmit another normal L1 measurement report associated with the measurement of the one or more additional reference signals based at least in part on the measurement of the one or more additional reference signals failing to satisfy the one or more light L1 measurement report conditions.

6. The apparatus of claim 1, wherein the one or more processors are further configured to receive configuration information indicating the configuration.

7. The apparatus of claim 1, wherein the configuration indicates that the light L1 measurement report is permitted to be transmitted after the consecutive number of normal L1 measurement reports are transmitted.

8. The apparatus of claim 1, wherein the configuration indicates that the normal L1 measurement report should be transmitted after the consecutive number of light L1 measurement reports are transmitted.

9. The apparatus of claim 1, wherein the light L1 measurement report includes at least one of a reference signal measurement value or a reference signal index indication.

10. The apparatus of claim 1, wherein the light L1 measurement report omits at least one of a reference signal measurement value or a reference signal index indication.

11. The apparatus of claim 1, wherein the one or more processors are further configured to receive a configuration indicating that a subsequently transmitted measurement report should be another normal L1 measurement report based at least in part on at least one of:

a beam failure detection, the measurement of one or more reference signals not satisfying a measurement threshold, or a payload size associated with the subsequently transmitted measurement report satisfying a payload threshold.

12. The apparatus of claim 1, wherein the one or more processors are further configured to indicate to a network entity that the light L1 measurement report is being transmitted.

13. The apparatus of claim 12, wherein the light L1 measurement report is indicated to the network entity using at least one of:

a discontinuous transmission, a communication including one or more signals transmitted in a specific sequence, a communication associated with a reduced number of resource blocks, a communication associated with a reduced number of symbols, a communication associated with a specific physical uplink control channel format, or an indication provided in a communication used for a different purpose.

14. An apparatus for wireless communication at a network entity, comprising:

a memory; and one or more processors, coupled to the memory, configured to:

transmit, to a user equipment (UE), configuration information indicating that:

a light layer 1 (L1) measurement report is permitted to be transmitted after a consecutive number of normal L1 measurement reports are transmitted, or a normal L1 measurement report should be transmitted after a consecutive number of light L1 measurement reports are transmitted, and receive, from, the normal L1 measurement report; and receive, from the UE, the light L1 measurement report based at least in part on a measurement of one or more reference signals satisfying one or more light L1 measurement report conditions, wherein the light L1 measurement report is based at least in part on the normal L1 measurement report, and wherein the light L1 measurement report at least one of:

omits at least some information that was transmitted in the normal L1 measurement report, or contains different information than information that was transmitted in the normal L1 measurement report.

15. The apparatus of claim 14, wherein the one or more light L1 measurement report conditions include the measurement of the one or more reference signals differing from a measurement of one or more previously transmitted reference signals by less than a threshold amount, wherein the measurement of the one or more previously transmitted reference signals is associated with the normal L1 measurement report.

16. The apparatus of claim 15, wherein the one or more reference signals include multiple reference signals, and wherein the one or more light L1 measurement report conditions include a measurement of each reference signal of the multiple reference signals differing from a measurement of a corresponding reference signal of the one or more previously transmitted reference signals by less than the threshold amount.

17. The apparatus of claim 15, wherein the one or more reference signals include multiple reference signals, and wherein the one or more light L1 measurement report conditions include a measurement of a subset of reference signals of the multiple reference signals differing from a measurement of a corresponding subset of reference signals of the one or more previously transmitted reference signals by less than the threshold amount.

18. The apparatus of claim 14, wherein the one or more processors are further configured to receive, from the UE, another normal L1 measurement report associated with a measurement of one or more additional reference signals based at least in part on the measurement of the one or more additional reference signals failing to satisfy the one or more light L1 measurement report conditions.

19. A method of wireless communication performed by a user equipment (UE), comprising:
performing a measurement of one or more reference signals associated with a layer 1 (L1) measurement report; and
transmitting a light L1 measurement report associated with the measurement of the one or more reference signals based at least in part on:
a configuration of the UE indicating that:
the light L1 measurement report is permitted to be transmitted after a consecutive number of normal L1 measurement reports are transmitted, or
one or more normal L1 measurement reports should be transmitted after a consecutive number of light L1 measurement reports are transmitted, and
the measurement of the one or more reference signals satisfying one or more light L1 measurement report conditions, wherein the light L1 measurement report is based at least in part on a previously transmitted normal L1 measurement report, and wherein the light L1 measurement report at least one of:
omits at least some information that was transmitted in the previously transmitted normal L1 measurement report, or
contains different information than the previously transmitted normal L1 measurement report.

20. The method of claim 19, wherein the one or more light L1 measurement report conditions include the measurement of the one or more reference signals differing from a measurement of one or more previously received reference signals by less than a threshold amount, wherein the measurement of the one or more previously received reference signals is associated with the previously transmitted normal L1 measurement report.

* * * * *